(12) United States Patent
Ohtsuka et al.

(10) Patent No.: US 7,717,623 B2
(45) Date of Patent: May 18, 2010

(54) OPTICAL CONNECTOR AND OPTICAL CONNECTOR ASSEMBLING METHOD

(75) Inventors: Kenichiro Ohtsuka, Yokohama (JP); Kazuhito Saito, Yokohama (JP); Wataru Sakurai, Yokohama (JP); Masaki Ohmura, Yokohama (JP); Yuko Masunaga, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 578 days.

(21) Appl. No.: 11/404,094

(22) Filed: Apr. 14, 2006

(65) Prior Publication Data

US 2006/0257079 A1 Nov. 16, 2006

(30) Foreign Application Priority Data

Apr. 14, 2005 (JP) ............................ P2005-117282
Aug. 9, 2005 (JP) ............................ P2005-231210

(51) Int. Cl.
*G02B 6/36* (2006.01)
(52) U.S. Cl. ...................................................... 385/53
(58) Field of Classification Search .................. 385/53, 385/58
See application file for complete search history.

(56) References Cited

U.S. PATENT DOCUMENTS

| | | | |
|---|---|---|---|
| 4,629,284 A | 12/1986 | Malavieille | |
| 5,129,024 A * | 7/1992 | Honma | 385/76 |
| 5,245,683 A | 9/1993 | Belenkiy et al. | |
| 5,452,386 A | 9/1995 | Van Woesik | |
| 5,748,821 A | 5/1998 | Schempp et al. | |
| 5,835,652 A | 11/1998 | Yagi et al. | |
| 5,984,532 A | 11/1999 | Tamaki et al. | |
| 6,174,091 B1 | 1/2001 | Herrmann | |

(Continued)

FOREIGN PATENT DOCUMENTS

FR 2 464 490 3/1981

(Continued)

OTHER PUBLICATIONS

Japanese Office Action, with English Translation, issued in Japanese Patent Application No. JP 2003-358435, mailed on Apr. 1, 2008.

(Continued)

*Primary Examiner*—Uyen-Chau N Le
*Assistant Examiner*—Hoang Tran
(74) *Attorney, Agent, or Firm*—McDermott Will & Emery LLP

(57) ABSTRACT

The present invention relates to an optical connector and an optical connector assembling method allowing simplification of assembly, improvement of reliability, and lower prices. The optical connector comprises a connector plug for holding a coated optical fiber and a connector socket for holding a coated optical fiber. The connector plug has a fiber holding portion disposed in a plug housing, and a fiber inserting hole is provided in the fiber holding portion. A fiber deflection space for allowing deflection of the coated optical fiber, when the coated optical fibers are butted, is provided in the plug housing. The connector socket has a fiber holding portion disposed in a socket housing, and a fiber inserting hole is provided in the fiber holding portion. A fiber deflection space for allowing deflection of the coated optical fiber, when the coated optical fibers are butted, is provided in the socket housing.

18 Claims, 26 Drawing Sheets

U.S. PATENT DOCUMENTS

| | | | |
|---|---|---|---|
| 6,913,392 B2 | 7/2005 | Grzegorzewska et al. | |
| 2004/0071407 A1* | 4/2004 | Vergeest | 385/58 |
| 2004/0247255 A1* | 12/2004 | Rosenburg et al. | 385/78 |
| 2006/0251359 A1* | 11/2006 | Morgenstern | 385/78 |

FOREIGN PATENT DOCUMENTS

| | | |
|---|---|---|
| GB | 1 447 469 | 8/1976 |
| JP | 50-133847 | 10/1975 |
| JP | 01-216304 | 8/1989 |
| JP | 7-270646 | 10/1995 |
| JP | 9-159860 | 6/1997 |
| JP | 2000-298227 | 10/2000 |
| JP | 2003-177275 | 6/2003 |
| JP | 2005-114770 | 4/2005 |
| JP | 2005-121988 | 5/2005 |

OTHER PUBLICATIONS

Japanese Office Action, with English Translation, issued in Japanese Patent Application No. JP 2003-358435, dated Jun. 17, 2008.

US Office Action issued in U.S. Appl. No. 11/783,607 dated on Aug. 22, 2008.

* cited by examiner

Fig.2
(a)
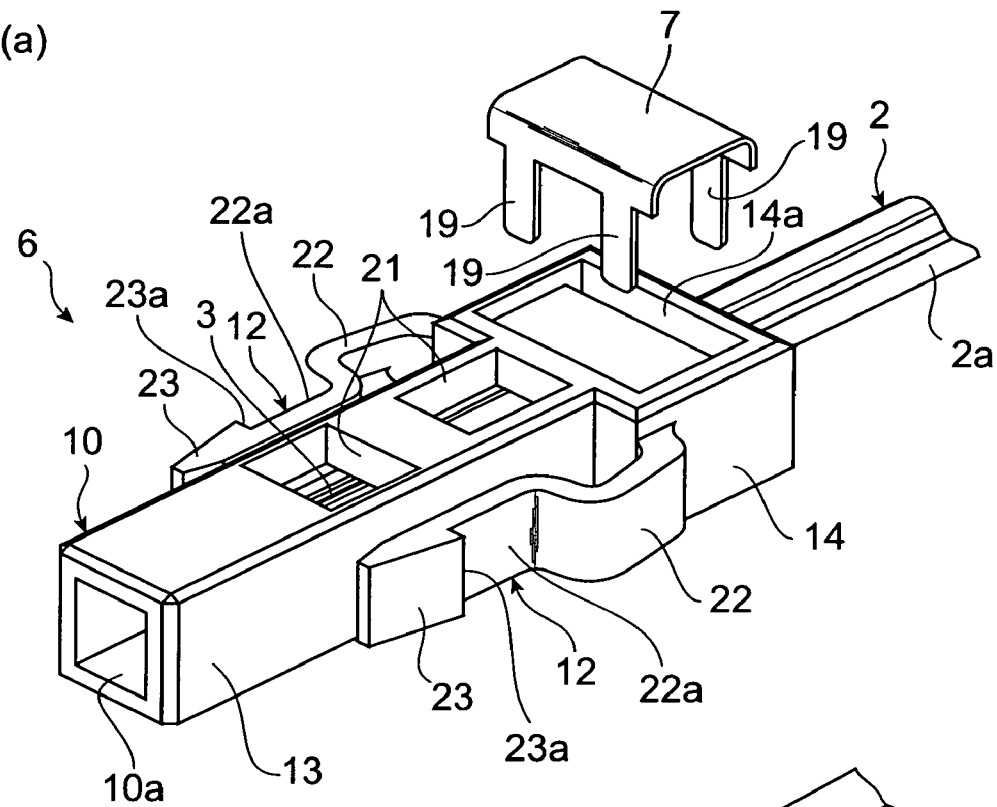
(b)
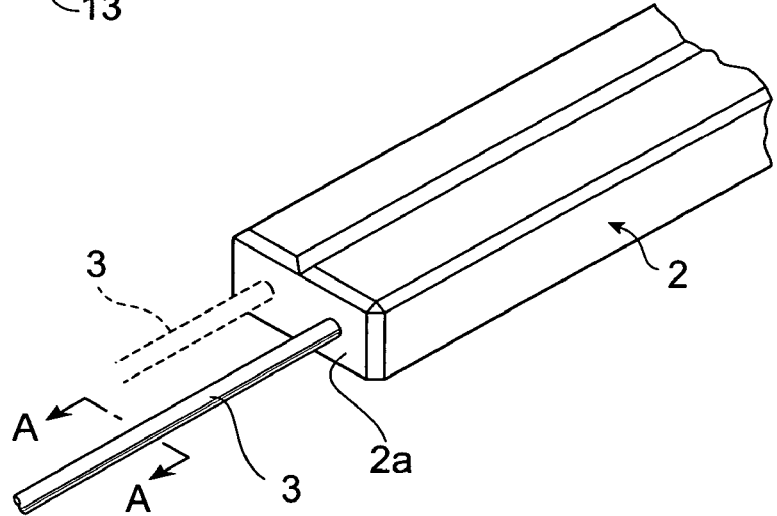
(c)
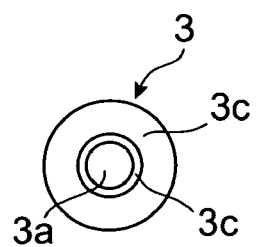

OPTICAL CONNECTOR AND OPTICAL CONNECTOR ASSEMBLING METHOD

BACKGROUND OF THE INVENTION

1. Field of the Invention

The present invention relates to an optical connector for butt-connecting of, for example, coated optical fibers themselves and to a method for assembling the optical connector.

2. Related Background Art

As for an optical connector used conventionally, one described in, for example, patent document 1 is known. The optical connector described in this document is provided with a pair of ferrules for holding an optical fiber, an alignment sleeve for allowing butt-connecting of front edge surfaces of these ferrules, a pair of plug housings for accommodating each ferrule, a pair of coil springs disposed in each of the plug housings for exerting a biasing force to the ferrule, and a pair of adapters for connecting each of plug housings.

Patent Document 1: Japanese Patent Application Laid-Open No. Hei 1-216304

SUMMARY OF THE INVENTION

The inventors have studied conventional optical connectors in detail, and as a result, have found problems as follows. Namely, before an optical fiber is assembled to a ferrule, a coating at front edge of the optical fiber should be removed to expose a bared fiber (fiber glass portion). However, when the coating of the optical fiber is removed, coating refuse or the like adheres to the bared fiber, and therefore, the coating refuse or the like should be wiped off with, for example, sanitary cotton dampened with alcohol or the like for cleaning, thereby resulting in a complicated assembly step of optical connectors. Furthermore, when the coating of the optical fiber is removed, the bared fiber in unprotected state is touched directly, and this can result in reduction in reliability of the optical connector. Still further, the number of components such as an alignment sleeve, a coil spring and an adapter or the like constituting the optical connector increases, thereby resulting in increased costs.

In order to overcome the above-mentioned problems, it is an object of the present invention to provide an optical connector and a method of assembling the same allowing simplification of assembly and improvement of reliability, and lower prices.

The present invention is directed to an optical connector for butt-connecting a first coated optical fiber in a first coated fiber cable which is exposed by removing an armor of the first fiber cable to a second coated optical fiber in a second fiber cable which is exposed by removing an armor of the second fiber cable. The optical connector comprises a first fiber connecting member, a second fiber connecting member, and a fixing structure. The first fiber connecting member holds the first coated optical fiber. The second fiber connecting member holds the second coated optical fiber. And, the fixing structure detachably fixes the first fiber connecting member and the second fiber connecting member. Furthermore, the first fiber connecting member includes a first housing having a first cable fixing portion to which the first fiber cable is fixed, and a first fiber holding portion which is connected to the first housing and which has a first fiber inserting hole with a diameter substantially identical with an outer diameter of the coated first coated optical fiber. On the other hand, the second fiber connecting member includes a second housing having a second cable fixing portion to which the second fiber cable is fixed, and a second fiber holding portion which is connected to the second housing, which has a second fiber inserting hole with a diameter substantially identical with an outer diameter of the second coated optical fiber, and which is butt-connected with respect to the first fiber holding portion.

In particular, in the optical connector according to the present invention, the first fiber connecting member has a first accommodating space (fiber deflection space), provided in an interior of the first housing while being positioned between the first fiber holding portion and the first cable fixing portion, for allowing deflection of the first coated optical fiber when the first coated optical fiber and the second coated optical fiber are butted. In other words, the first fiber connecting member is attached to the first fiber cable while accommodating the exposed part of the first coated optical fiber. At this time, the first cable fixing portion of the first housing functions to fix the first fiber cable onto the first housing itself through the armor of the first fiber cable. In the first fiber holding portion, jointed to the first housing, the inner surface of the first fiber inserting hole functions to confine a movement of the first coated optical fiber on a direction orthogonal to a longitudinal direction of the first coated optical fiber while making the first coated optical fiber become slidable in the longitudinal direction of the first coated optical fiber.

In the same manner, the second fiber connecting member has a second accommodating space (fiber deflection space), provided in an interior of the second housing while being positioned between the second fiber holding portion while being positioned the second cable fixing portion, for allowing deflection of the second coated optical fiber when the first coated optical fiber and the second coated optical fiber are butted. In other words, the second fiber connecting member is attached to the second fiber cable while accommodating the exposed part of the second coated optical fiber. At this time, the first cable fixing portion of the second housing functions to fix the first fiber cable onto the second housing itself through the armor of the second fiber cable. In the second fiber holding portion, jointed to the second housing, the inner surface of the second fiber inserting hole functions to confine a movement of the second coated optical fiber on a direction orthogonal to a longitudinal direction of the second coated optical fiber while making the second coated optical fiber become slidable in the longitudinal direction of the second coated optical fiber.

When the first coated optical fiber and the second coated optical fiber are connected using such an optical connector, first, the first coated optical fiber is assembled to a first fiber connecting member, and the second coated optical fiber is assembled to a second fiber connecting member. In particular, an armor at a front edge part of the first fiber cable is removed to expose a part of the first coated optical fiber and at the same time, an armor at a front edge part of the second fiber cable is removed to expose a part of the second coated optical fiber. Subsequently, the first coated optical fiber is inserted into the first fiber inserting hole of the first fiber connecting member, and the first fiber cable is fixed to the first cable fixing portion while the first coated optical fiber is slightly projected from the butted surface of the first fiber holding portion. In this case, since the first fiber inserting hole has a diameter substantially identical with an outer diameter of the first coated optical fiber, it is possible to insert the first coated optical fiber into the first fiber inserting hole while the coating of the first coated optical fiber is remained. Also, the second coated optical fiber is assembled to the second fiber connecting member with a similar manner as mentioned.

Then, the first coated optical fiber and the second coated optical fiber are connected by fixing the first fiber connecting member and the second fiber connecting member with fixing structure while the butted surface of the first fiber holding portion and the butted surface of the second fiber holding portion are butted each other. In this case, since the first coated optical fiber is slightly protruded from the butted surface of the first fiber holding portion and the second coated optical fiber is slightly protruded from the butted surface of the second fiber holding portion, when the butted surface of the first fiber holding portion and the butted surface of the second fiber holding portion are butted, the first coated optical fiber and the second coated optical fiber retract. However, since a space to allow deflection of the first coated optical fiber is provided inside the first housing and a space to allow deflection of the second coated optical fiber is provided inside the second housing, retraction of the first coated optical fiber and the second coated optical fiber is absorbed in the form of deflection. With this consideration, the first coated optical fiber and the coated second coated optical fiber are stably connected without being detached.

In the optical connector according to the present invention, the first coated optical fiber and the second coated optical fiber are assembled to a first fiber connecting member and a second fiber connecting member, respectively without removing the coating of the first coated optical fiber and the second coated optical fiber, and therefore, there is no need for cleaning such as removal of coating refuse or the like. With this consideration, assembly of the optical connector can be made simply. Further, since glass portions (bared fiber portions) of the first coated optical fiber and the second coated optical fiber are not brought to unprotected state, a worker can perform assembly job of the optical connector without contacting directly with the bared fiber. This consideration can prevent reduction in the reliability of the optical connector. Furthermore, when the first fiber connecting member and the second fiber connecting member are connected, a desired connecting force of the first coated optical fiber and the second coated optical fiber is obtained by deflecting at least one of the first coated optical fiber and the second coated optical fiber, and therefore, a special components such as a coil spring or the like to ensure positive connection of the first coated optical fiber and the second coated optical fiber is unnecessary. With this consideration, the number of components constituting the optical connector can be reduced thereby contributing to promotion of cost reduction.

Preferably, a protruded portion for alignment projecting to opposite side of the first cable fixing portion is provided to the first fiber holding portion, and a depressed portion for alignment, to be engaged with a protruded portion for alignment, opening to opposite side of the second cable fixing portion is provided to the second fiber holding portion. In this case, the alignment of the first fiber inserting hole and the second fiber inserting hole is carried out by engaging the protruded portion for alignment with the depressed portion for alignment. With this consideration, alignment of the first coated optical fiber being inserted into the first fiber inserting hole with the second coated optical fiber being inserted into the second fiber inserting hole can be performed with ease.

Also preferably, the first fiber holding portion is provided inside the first housing and the second fiber holding portion is provided inside the second housing. In this case, the first coated optical fiber is protected by the first housing and the second coated optical fiber is protected by the second housing. With this consideration, the first coated optical fiber and the second coated optical fiber are protected from damages or the like and also, cleaning or the like of the first coated optical fiber and the second coated optical fiber is unnecessary.

Further, preferably, to one of the first housing and the second housing is provided a housing receptor portion, to which the other of the first housing and the second housing is engaged. In this case, when the housing receptor portion is formed being tailored to an outer shape of either the first housing or the second housing, it is possible to butt surely the first coated optical fiber being inserted into the first fiber inserting hole and the second coated optical fiber being inserted into the second fiber inserting hole. Furthermore, in a state where the first fiber connecting member and the second fiber connecting member are connected, either of the first housing or the second housing is restrained by the other, and therefore, the first housing and the second housing become resistant to a bending moment.

The fixing structure preferably includes a locking portion which is connected to either of the first housing or the second housing for locking the first housing and the second housing, and a locking receiving portion to be engaged with the locking portion which is provided to the other of the first housing and the second housing. In this case, it is possible to fix simply and surely the first fiber connecting member and the second fiber connecting member without using any special fixing portion.

It is preferable that an opening edge of the first fiber inserting hole at the first fiber holding portion and an opening edge of the second fiber inserting hole at the second fiber holding portion are chamfered, respectively. In this case, insertion of the first coated optical fiber into the first fiber inserting hole becomes easy, and the first coated optical fiber becomes scratch-proof when a front edge of the first coated optical fiber projecting from a butted surface of the first fiber holding portion retracts. This is also applicable to the second coated optical fiber.

It is preferable that the first housing and the first fiber connecting member including the first fiber holding portion are molded integrally, and that the second housing and the second fiber connecting member including the second fiber holding portion is molded integrally. In this case, the number of components constituting the optical connector can be further reduced thereby contributing to promotion of cost reduction.

In this case, the first fiber connecting member and the second fiber connecting member are preferably comprised of one of polyetherimide, polybutylene terephthalate, polycarbonate, and polyether sulfone. In this instance, the precision molding of the first fiber connecting member and the second fiber connecting member is made possible. Besides, it is possible to obtain the first fiber connecting member and the second fiber connecting member being excellent in heat resistance and reliability.

Further, preferably, the first fiber cable is fixed to the first cable fixing portion while the first coated optical fiber is inserted into the first fiber inserting hole, the second fiber cable is fixed to the second cable fixing portion while the second coated optical fiber is inserted into the second fiber inserting hole, and at least one of the first coated optical fiber and the second coated optical fiber is projected from the butted surface of at least one of the first fiber holding portion and the second fiber holding portion. In such a configuration that the first coated optical fiber is assembled to the first fiber connecting member and the second coated optical fiber is assembled to the second fiber connecting member, for example, in a worksite, the first fiber connecting member and the second fiber connecting member may be simply connected, and therefore, burden of the worker can be reduced.

In this instance, the first coated optical fiber is projected from the butted surface of the first fiber holding portion and the second coated optical fiber is projected from the butted surface of the second fiber holding portion, and amount of protrusion of the first coated optical fiber and the second coated optical fiber is in a range of 0.01 to 1.00 mm. In this case, when the butted surface of the first fiber holding portion and the butted surface of the second fiber holding portion are butted, a sufficient connecting force is surely obtained between the first coated optical fiber and the second coated optical fiber. Besides, since the first coated optical fiber and the second coated optical fiber will not be deflected excessively, strength of the first coated optical fiber and the second coated optical fiber can be maintained sufficiently.

The optical connector according to the present invention may further comprises an outer housing for accommodating the first fiber connecting member and the second fiber connecting member being fixed mutually by the fixing structure, a first taking-out portion for taking-out the first fiber cable outside the outer housing is provided to one end of the outer housing, and a second taking-out portion for taking-out the second fiber cable outside the outer housing is provided to the other end of the outer housing. In this case, since the first fiber connecting member and the second fiber connecting member are covered by the outer housing in mutually fixed state, the first fiber connecting member and the second fiber connecting member are protected against moisture, dust or the like. With this consideration, the connection of the first coated optical fiber and the second coated optical fiber is maintained further favorably.

In a state where the first fiber connecting member and the second fiber connecting member are fixed, the optical connector according to the present invention preferably further comprises a seal member in ring-shape. The seal member in ring-shape is interposed between the first fiber holding portion and the second fiber holding portion so as to enclose the first fiber inserting hole or the second fiber inserting hole. In this case, since entry of moisture, dust or the like to a connecting surface between the first coated optical fiber and the second coated optical fiber at the first fiber holding portion and the second fiber holding portion is prevented by the seal member in ring-shape, connection of the first coated optical fiber and the second coated optical fiber is maintained further favorably.

Furthermore, the present invention is directed to an optical connector for butt-connecting a coated optical fiber in a fiber cable which is exposed by removing an armor of the fiber cable and an optical element that emits or receives light, the optical connector comprises: a fiber connecting member for holding the coated optical fiber; an optical header including the optical element inside; and a fixing structure for detachably fixing the fiber connecting member and the optical header, the fiber connecting member includes: a housing having a cable fixing portion to which the fiber cable is fixed; and a fiber holding portion having a fiber inserting hole with a diameter substantially identical with an outer diameter of a covering of the coated optical fiber being connected to the housing, and there is provided, in an interior of the housing, a space for allowing deflection of the coated optical fiber when the coated optical fiber and the optical element are butt-connected, between the fiber holding portion and the cable fixing portion.

When the coated optical fiber and the optical element are connected using such an optical connector, first, the coated optical fiber is assembled to the fiber connecting member. Particularly, an armor at a front edge part of the fiber cable is removed so as to expose a part of the coated optical fiber. Subsequently, the coated optical fiber is inserted into a fiber inserting hole of the fiber connecting member and the fiber cable is fixed to the cable fixing portion while the coated optical fiber is slightly protruded from a butted surface of a fiber holding portion. In this case, since the fiber inserting hole has a diameter substantially identical with outer diameter of the coated optical fiber, it is possible to insert the coated optical fiber into the fiber inserting hole with the coated optical fiber being supported.

Then, the coated optical fiber and the optical element are connected by fixing the fiber connecting member and an optical header by the fixing structure while the butted surface of the fiber holding portion and the optical element are butted directly or via other member. In this case, since the coated optical fiber is slightly projected from the butted surface of the fiber holding portion, the coated optical fiber will retract when the butted surface of the fiber holding portion and the optical element are butted. However, since there is a space for allowing deflection of the coated optical fiber inside the housing, retraction of the coated optical fiber is absorbed in the form of deflection. With this consideration, the coated optical fiber and the optical element are stably connected without being detached.

As mentioned above, in the optical connector according to the present invention, since the coated optical fiber can be assembled to the fiber connecting member without removing the coating of the coated optical fiber, cleaning such as removal of covering refuse or the like is unnecessary. With this consideration, assembly of the optical connector can be made simply. Furthermore, since glass portion (bare fiber) of the coated optical fiber is not brought to unprotected state, the worker can perform assembly job of the optical connector without contacting directly with the bare fiber. This consideration can prevent reduction in reliability of the optical connector. When the fiber connecting member and the optical header are connected, a desired connecting force of the coated optical fiber and the optical element is obtained by deflecting the coated optical fiber, and therefore, special components such as a coil spring or the like to ensure positive connection of the coated optical fiber and the optical element is unnecessary. With this consideration, the number of components constituting the optical connector can be reduced thereby contributing to promotion of cost reduction.

The assembly method of the optical connector according to the present invention comprises the steps of: cutting a front edge part of a first coated optical fiber with a coating which is exposed by removing an armor at a front edge part of the first fiber cable including the first coated optical fiber; cutting a front edge part of the second coated optical fiber with a coating which is exposed by removing an armor of a front edge part of a second fiber cable including the second coated optical fiber; preparing above-mentioned optical connector; fixing the first fiber cable to a first cable fixing portion while inserting the first coated optical fiber into an inserting hole for the first coated optical fiber towards the butted surface side of the first fiber holding portion; and fixing the second fiber cable to a second cable fixing portion while inserting the second coated optical fiber into an inserting hole for the second coated optical fiber towards the butted surface side of the second fiber holding portion.

In accordance with the present invention, it is possible to assemble the first coated optical fiber and the second coated optical fiber to the first fiber connecting member and the second fiber connecting member, respectively without removing the coatings of the first coated optical fiber and the second coated optical fiber, and therefore, cleaning such as removal of coating refuse or the like is unnecessary. With this consideration, assembly of the optical connector can be made simply. Furthermore, since each glass portion (bare fiber) of the first coated optical fiber and the second coated optical fiber is not brought to unprotected state, the worker can perform assembly job of the optical connector without contacting directly with the bare fiber. This consideration can prevent reduction in reliability of the optical connector. When the first fiber connecting member and the second fiber connecting member are connected, a desired connecting force between the first coated optical fiber and the second coated optical fiber is obtained by deflecting at least one of the first coated optical fiber and the second coated optical fiber, and therefore, special components such as a coil spring or the like to ensure positive connection of the first coated optical fiber and the second coated optical fiber is unnecessary. With this consideration, the number of components constituting the optical connector can be reduced thereby contributing to promotion of cost reduction.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a perspective view showing a coated optical fiber held by a connector plug shown in FIG. 1;

DETAILED DESCRIPTION OF THE PREFERRED EMBODIMENTS

In the following, embodiments of an optical connector and an optical connector assembling method according to the present invention will be explained in detail with reference to FIGS. 1 to 26. In the explanation of the drawings, constituents identical to each other will be referred to with numerals identical to each other without repeating their overlapping descriptions.

Figure 1:
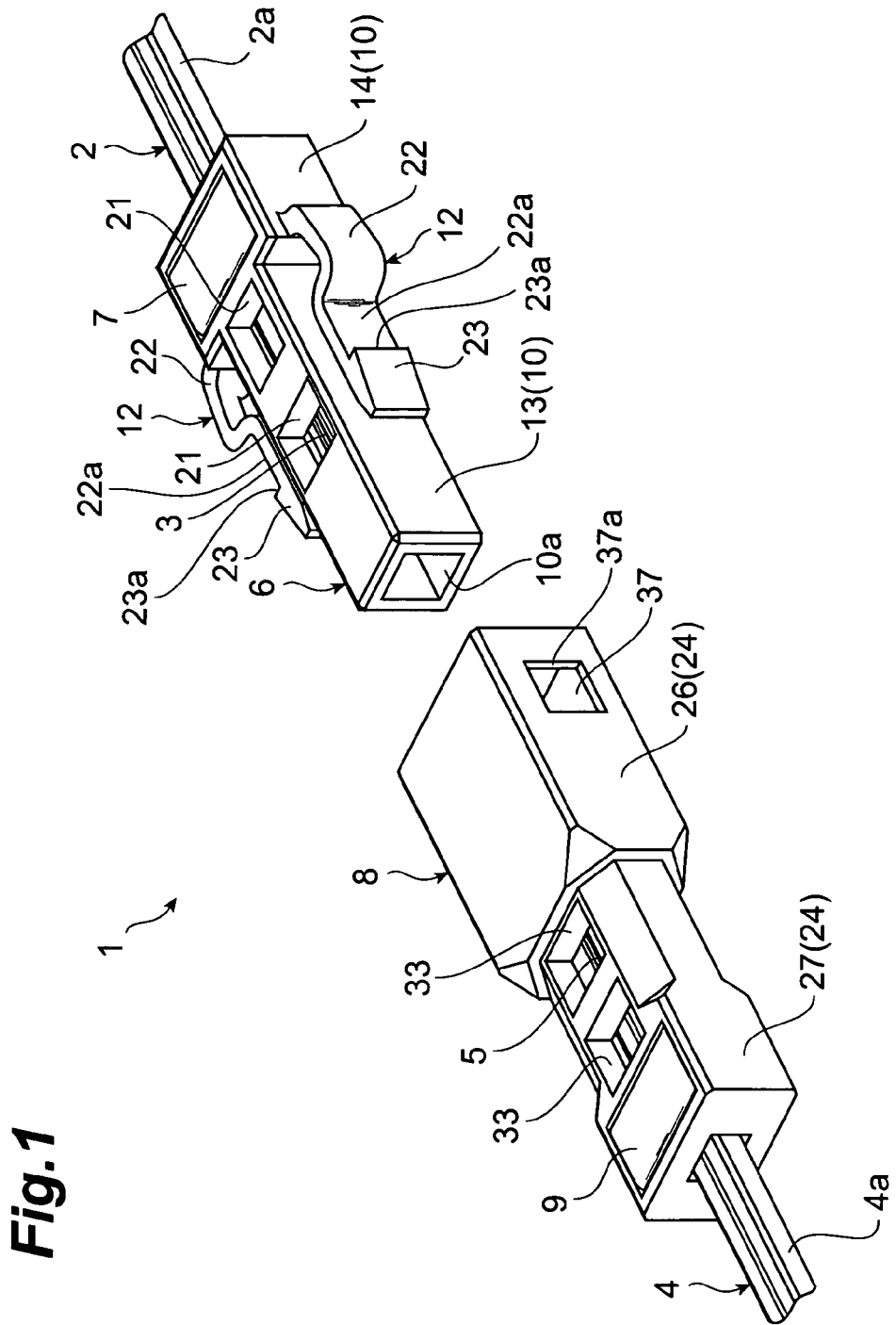
FIG. 1 is a perspective view showing a first embodiment of an optical connector according to the present invention.

FIG. 1 is a perspective view showing a first embodiment of an optical connector according to the present invention. In FIG. 1, an optical connector 1 according to the first embodiment is for connecting a coated optical fiber 3 which is exposed by removing an armor 2a of a fiber cable 2 to a coated optical fiber 5 which is exposed by removing an armor 4a of a fiber cable 4, by butting each other. The fiber cable 2 is a cable for indoor use for collectively covering, for example, the coated optical fiber 3 with a plurality of cores (2-core in this example) and a pair of tension members (not shown) by the armor 2a. The fiber cable 4 is an optical cable having the same structure as that of the fiber cable 2.

The optical connector 1 comprises a connector plug 6 for holding the coated optical fiber 3, a cable fixing member 7 for fixing the fiber cable 2 to the connector plug 6, a connector socket 8 for holding the coated optical fiber 5, and a cable fixing member 9 for fixing the fiber cable 4 to the connector socket 8.

Figure 3:
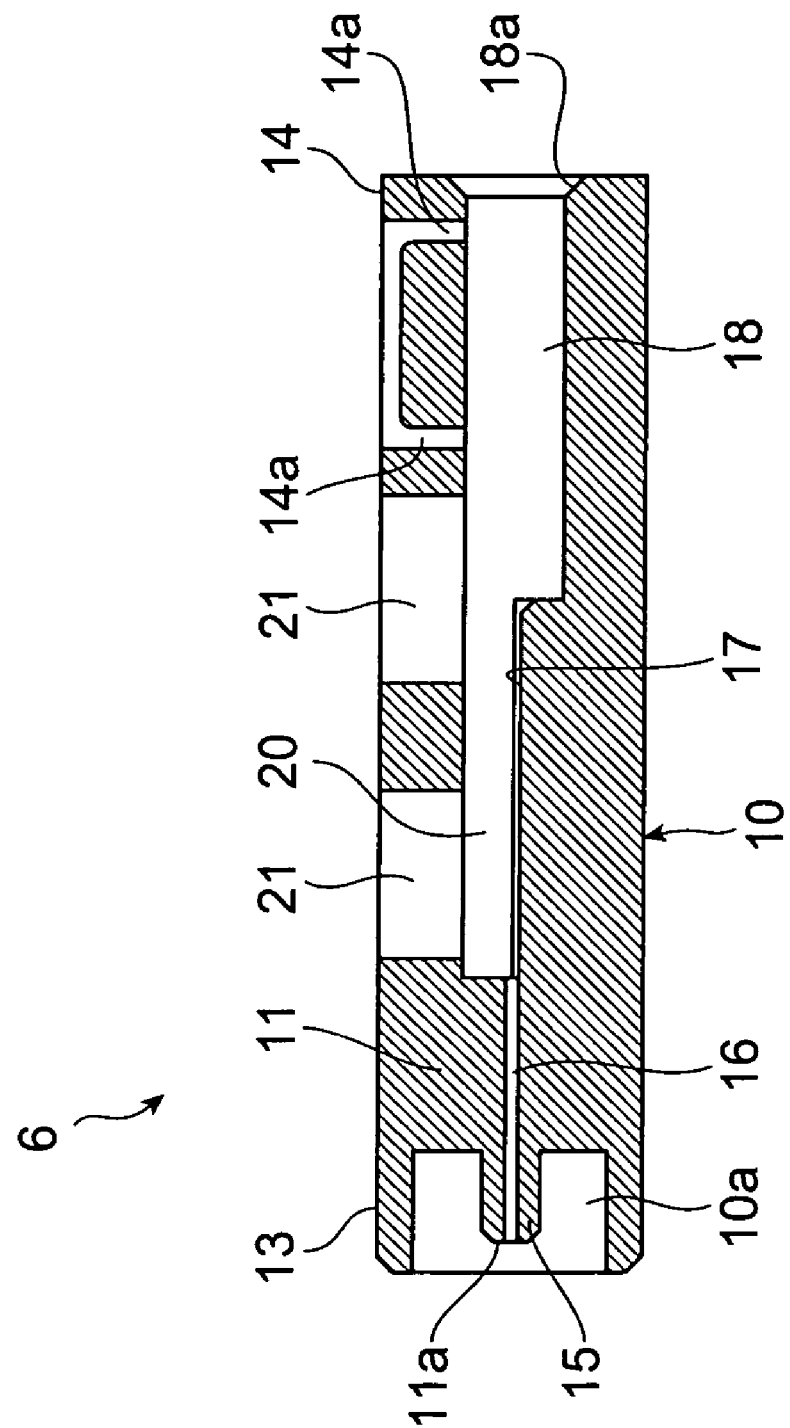
FIG. 3 is a vertical sectional view of the connector plug shown in FIG. 2.
Figure 4:
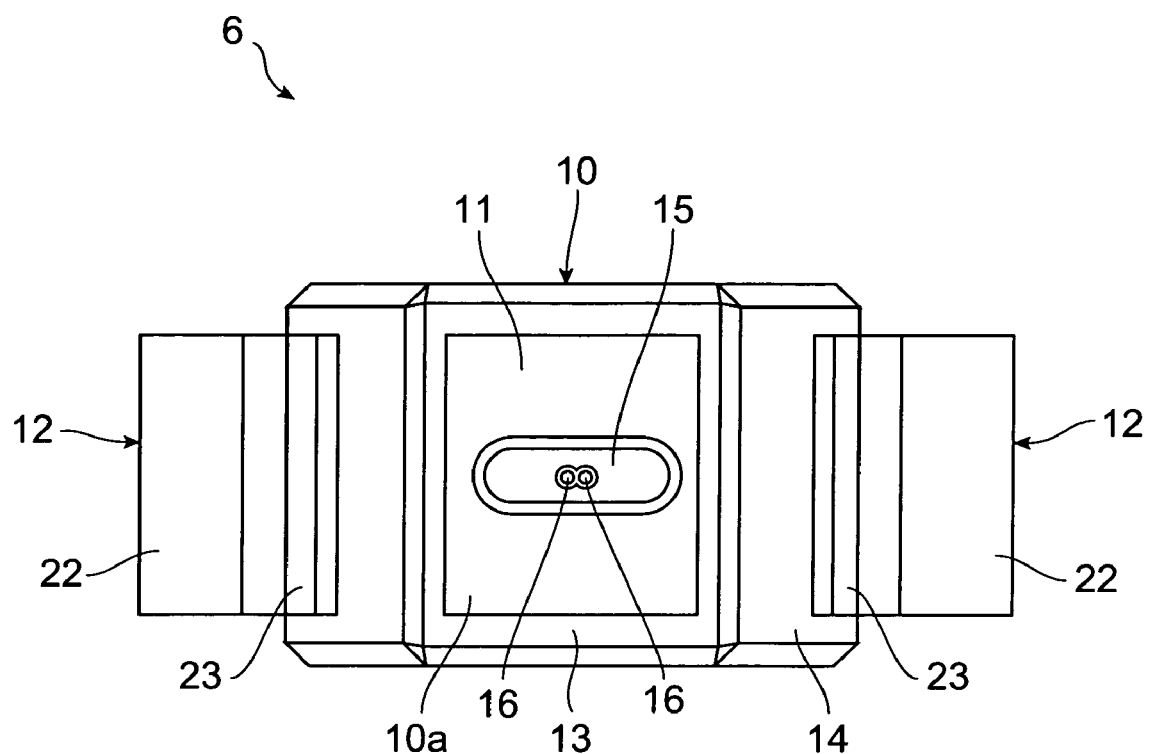
FIG. 4 is a front view of the connector plug shown in FIG. 2.

FIG. 2 is an exploded perspective view of the connector plug 6 and the cable fixing member 7, FIG. 3 is a vertical sectional view of the connector plug 6, and FIG. 4 is a front view of the connector plug 6. Particularly, in FIG. 2, the area (a) shows the connector plug 6 to which the fiber cable 2 is attached, the area (b) shows a configuration of the fiber cable 2, and the area (c) shows a cross sectional view of the coated optical fiber 3 along the line A-A in the area (b).

As shown in the area (b) of FIG. 2, the fiber cable 2 comprises two coated optical fibers 3 and an armor 2a provided surround the coated fibers 3. In addition, as shown in the area (c) of FIG. 2, each coated optical fiber 3 comprises a bared fiber and a resin-coating provided on the outer periphery of the bared fiber, and the based fiber comprises a core region 3a extending along a predetermined axis, a cladding region 3b provided on the outer periphery of the core region 3a. The fiber cable 4 has the same structure as the above-mentioned fiber cable 3, and the coated optical fiber 5 has the same structure as the coated optical fiber 3.

In each of FIGS. 2 to 4, the connector plug 6 includes a plug housing 10 having a cross section in nearly rectangular form, a fiber holding portion 11 being connected to the plug housing 10, and a pair of latches 12 connected to the plug housing 10.

The plug housing 10 includes a housing body 13 and a cable fixing portion 14 disposed behind the housing body 13. The cable fixing portion 14 is broader than the housing body 13.

The fiber holding portion 11 is disposed inside the housing body 13. The fiber holding portion 11 includes a protruded portion 15 for alignment having a cross section in nearly oval shape protruding to front side (opposite side of cable fixing portion 14). A front edge surface of the protruded portion 15 for alignment is disposed at inner side than forward end surface of the plug housing 10. In other words, a depression 10a engaging with the connector socket 8 is formed at forward end side of the plug housing 10. In this configuration, the coated optical fiber 3 held by the fiber holding portion 11 is protected, and therefore, the coated optical fiber 3 becomes scratch-proof, and there is no need for cleaning of the coated optical fiber 3.

Two fiber inserting holes 16 having a cross section in circular form extending in fore and rear directions of the plug housing 10 to allow insertion of the coated optical fiber 3 are formed in an area including the protruded portion 15 for alignment in the fiber holding portion 11. A diameter of the fiber inserting hole 16 is designed to be slightly greater than an outer diameter of the coated optical fiber 3 (i.e., outer diameter of whole coated optical fiber including the resin-coating) and is substantially identical with an outer diameter of the coated optical fiber 3. A chamfer 16a is formed to an opening edge at both ends of the fiber inserting hole 16 of the fiber holding portion 11, respectively (see FIG. 5). In this configuration, the coated optical fiber 3 can be inserted easily into the fiber inserting hole 16 and end face of the coated optical fiber 3 becomes scratch-proof.

Two guide grooves 17 for introducing each of the coated optical fibers 3 to the fiber inserting hole 16 are provided to the housing body 13. Furthermore, a cable accommodation space 18 for holding the fiber cable 2 is formed in an area rear of the guide groove 17 inside the plug housing 10. A chamfer 18a is formed to an opening edge of the cable accommodation space 18 in the plug housing 10 to allow easy insertion of the fiber cable 2 into the cable accommodation space 18.

To the cable fixing portion 14 is provided aforementioned cable fixing member 7. The cable fixing member 7 has four leg parts 19 and a blade (not shown) to be cut into the armor 2a of the fiber cable 2 is provided to each of the leg parts 19. The cable fixing portion 14 has two hole parts 14a which are communicating with the cable accommodation space 18 and into which each leg part 19 is inserted.

A fiber deflection space 20 for deflecting the coated optical fiber 3 upwardly when the coated optical fibers 3, 5 themselves are butted is provided in an area between the fiber holding portion 11 and the cable accommodation space 18 (i.e., upper area of the guide groove 17) inside of the plug housing 10. Further, a window 21 is provided to the housing body 13 of the plug housing 10, and deflection state of the coated optical fiber 3 can be confirmed through this window 21.

The pair of latches 12 extends forwardly from forward end of both side surface of the cable fixing portion 14. Each of latches 12 has a grabbing part 22 including a portion being bent in width direction (front and rear directions and a direction perpendicular to up and down directions) of the housing body 13 and is elastically deformable with respect to width direction of the housing body 13. A locking pawl 23 for locking the connector plug 6 with respect to the connector socket 8 is provided at a front edge of each of latches 12. A hooking surface 23a orthogonal to an outer surface 22a of the grabbing part 22 is formed to a root of the locking pawl 23.

The plug housing 10 of the connector plug 6, the fiber holding portion 11 and each of latches 12 as mentioned above are molded integrally as one molded component. As for a resin material for forming the connector plug 6, any one of polyetherimide (PEI), polybutylene terephthalate (PBT), polycarbonate (PC), and polyether sulfone (PES) is preferably employed from viewpoints that precision molding is possible and that heat resistance and reliability are excellent.

Alternatively, the plug housing 10, the fiber holding portion 11 and each of latches 12 may be constituted by separate parts. However, preferably, these parts are formed integrally from low cost viewpoints.

Figure 6:
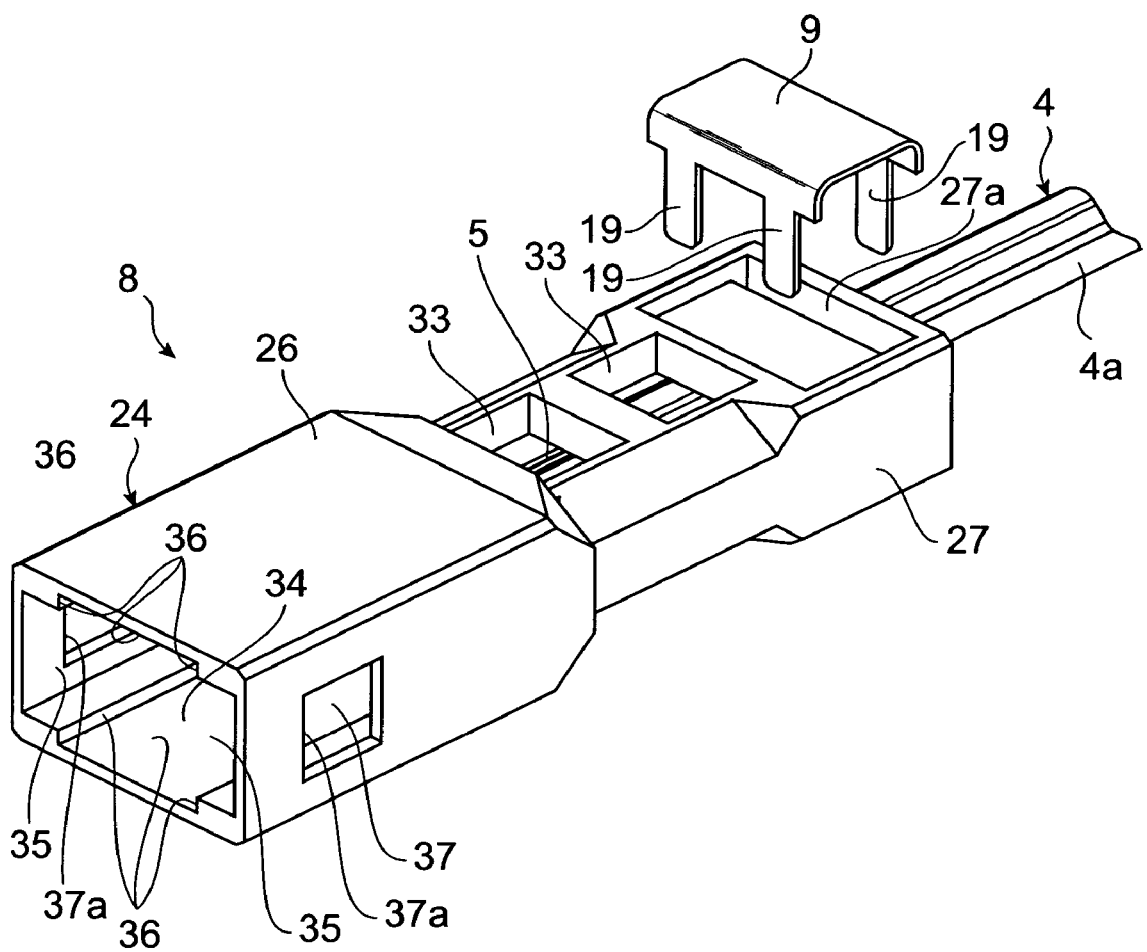
FIG. 6 is a perspective view showing the coated optical fiber held by the connector socket shown in FIG. 1.
Figure 7:
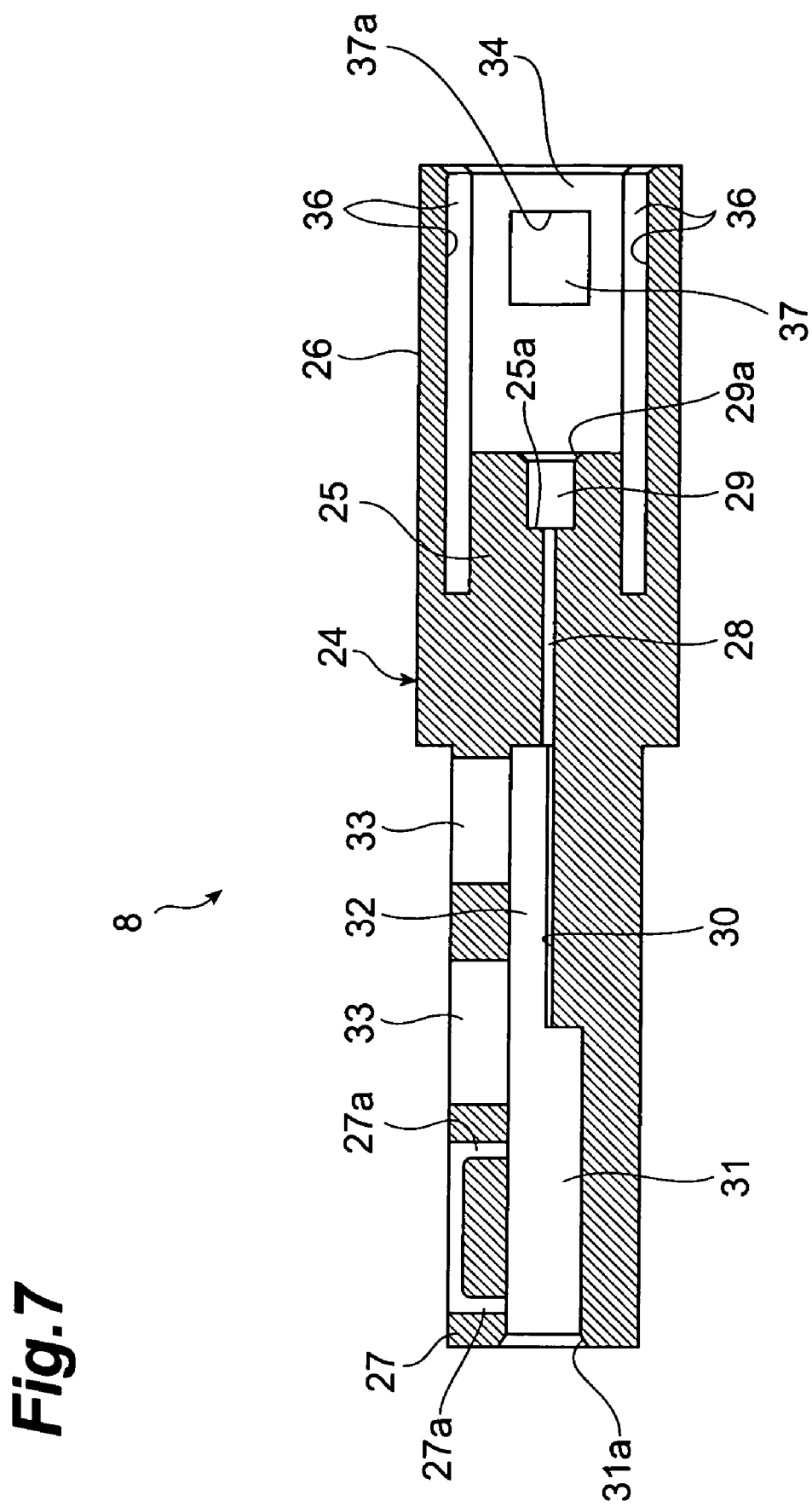
FIG. 7 is a vertical sectional view of the connector socket shown in FIG. 6.
Figure 8:
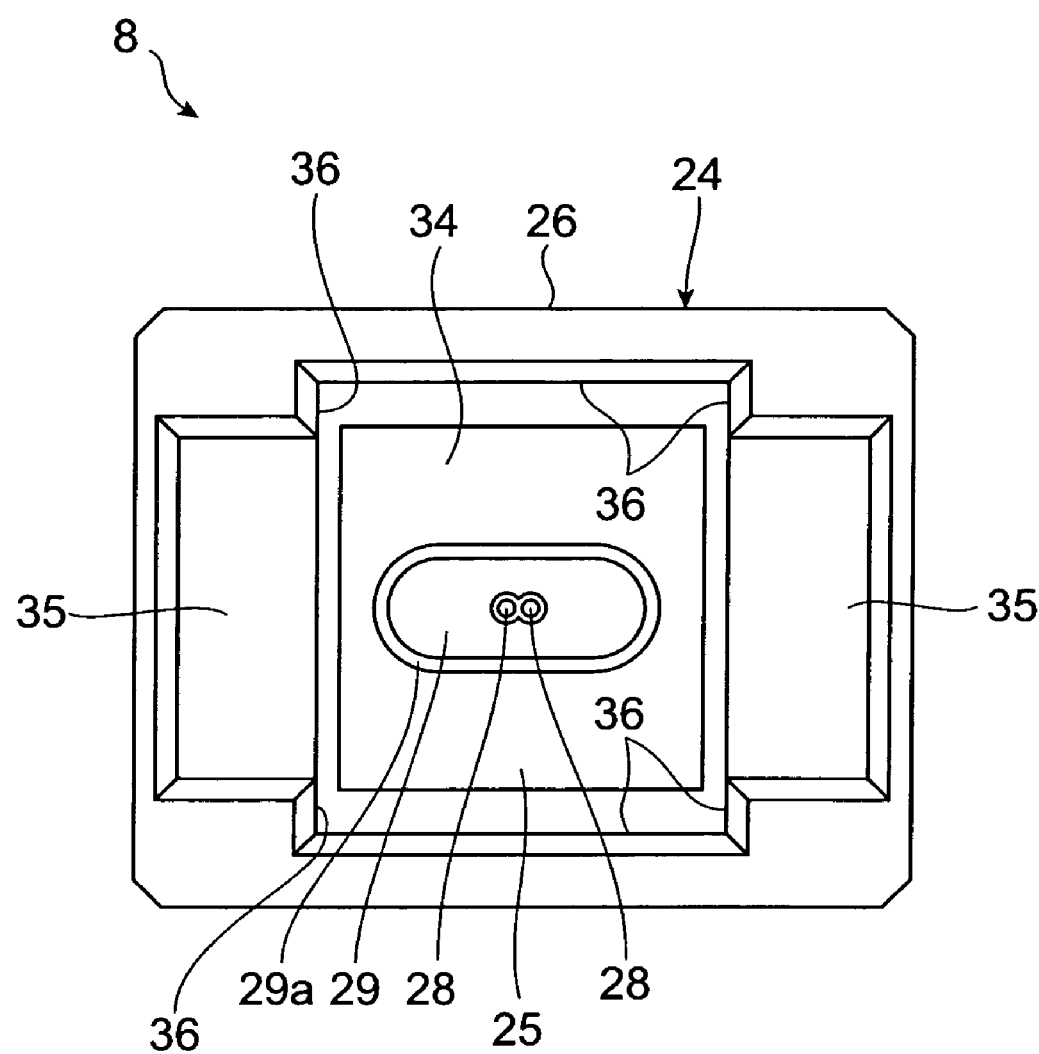
FIG. 8 is a front view of the connector socket shown in FIG. 6.

FIG. 6 is an exploded perspective view of the connector socket 8 and the cable fixing member 9, FIG. 7 is a vertical sectional view of the connector socket 8, and FIG. 8 is a front view of the connector socket 8.

In each of FIGS. 6 to 8, the connector socket 8 includes a socket housing 24 having a cross section in nearly rectangular form and a fiber holding portion 25 being connected to the socket housing 24. The socket housing 24 includes a housing body 26 and a cable fixing portion 27 disposed at the rear of the housing body 26.

The fiber holding portion 25 is provided inside the housing body 26. In the fiber holding portion 25 are formed two fiber inserting holes 28 having a cross section in circular form extending in fore and rear directions of the socket housing 24 to allow insertion of each of the fibers 5. A diameter of the fiber inserting hole 28 is slightly greater than an outer diameter of the covering of the coated optical fiber 5 and is substantially identical with the outer diameter of the coated optical fiber 5. A chamfer 28a is formed to an opening edge at both ends of the fiber inserting hole 28 in the fiber holding portion 25 to allow easy insertion of the coated optical fiber 5 into the fiber inserting hole 28 and to prevent an end face of the coated optical fiber 5 from being scarred (see FIG. 5).

Figure 5:
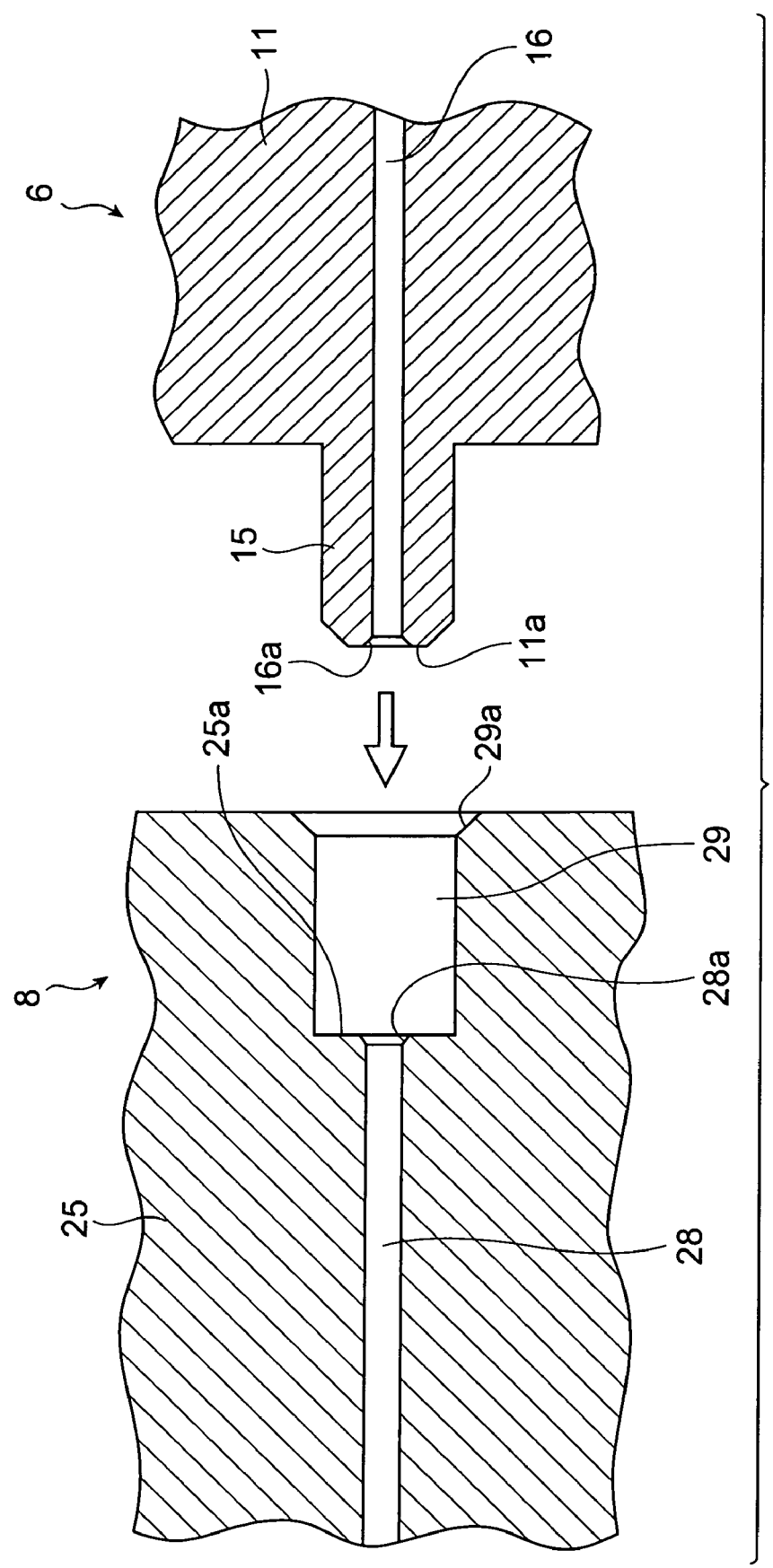
FIG. 5 is an enlarged sectional view showing connection portion between the connector plug and a connector socket shown in FIG. 1.

A depressed portion 29 for alignment, which is communicating with the fiber inserting hole 28 and has a cross section in nearly oval shape to be engaged with the protruded portion 15 for alignment of the plug housing 10, is provided at front end portion of the fiber holding portion 25. In this configuration, the alignment of the fiber inserting hole 16 of the fiber holding portion 11 with the fiber inserting hole 28 can be performed surely by simply inserting the protruded portion 15 for alignment into the depressed portion 29 for alignment as illustrated in FIG. 5. A chamfer 29a is formed to an opening edge of the depressed portion 29 for alignment in the fiber holding portion 25 to allow easy insertion of the protruded portion 15 for alignment.

Two guide grooves 30 for introducing each of the coated optical fibers 5 to the fiber inserting hole 28 are provided to the housing body 26. Further, a cable accommodation space 31 for holding the fiber cable 4 is formed in an area rear of the guide groove 30 inside the socket housing 24. A chamfer 31a is formed to an opening edge of the cable accommodation space 31 in the socket housing 24 to allow easy insertion of the fiber cable 4 into the cable accommodation space 31.

The above-mentioned cable fixing member 9 is provided to the cable fixing portion 27. The cable fixing member 9 has the same structure as the cable fixing member 7. The cable fixing portion 27 has two hole portions 27a which are communicating with the cable accommodation space 31 and into which the leg part 19 of the cable fixing member 9 is inserted.

In the interior of the socket housing 24, a fiber deflection space 32 to allow the coated optical fiber 5 deflecting upwardly when the coated optical fibers 3, 5 themselves are butted is provided in an area between the fiber holding portion 25 and the cable accommodation space 31, i.e., upper portion of the guide groove 30. Besides, a window 33 is provided to the housing body 26 of the socket housing 24 and observation of deflection state of the coated optical fiber 5 is possible through this window 33.

At forward end portion of the housing body 26, a plug housing receptor portion 34 into which the plug housing 10 of the connector plug 6 is engaged, and a pair of latch receptor portions 35 into which each of latches 12 of the connector plug 6 is inserted are provided. The latch receptor portions 35 are formed at both sides of the plug housing receptor portion 34, respectively.

An opening of the plug housing receptor portion 34 has a shape and dimensions corresponding to an outer shape of the housing body 13 of the plug housing 10. The housing body 26 has a guide surface 36 for positioning and then guiding the housing body 13, and for regulating the housing body 13 in up and down directions and width direction, and the plug housing receptor portion 34 is formed by the guide surface 36. In this configuration, it is possible to engage the protruded portion 15 for alignment of the plug housing 10 into the depressed portion 29 for alignment simply and surely to butt a front end surface 11a (butted surface of the fiber holding portion 11) and a bottom face 25a (butted surface of the fiber holding portion 25) of the depressed portion 29 for alignment.

The windows for locking receiving 37 to be engaged with each of the latches 12 are provided at both side surfaces of the housing body 26, respectively. The housing body 26 has a surface to be hooked 37a that forms a part of the window for locking receiving 37. The plug housing 10 is being locked with respect to the socket housing 24 while the hooking surface 23a of the locking pawl 23 of each of latches 12 is hooked to the surface to be hooked 37a of each of the window for locking receiving 37 (see FIG. 15). Each of the windows for locking receiving 37 is formed at a position where the front end surface 11a of the protruded portion 15 for alignment strikes the bottom face 25a of the depressed portion 29 for alignment while the plug housing 10 and the socket housing 24 are in locked state.

Preferably, the socket housing 24 of the connector socket 8 and the fiber holding portion 25 as described above are molded integrally as one molded component. A resin material for forming the connector socket 8 is the same resin material as used for forming the connector plug 6.

Although in this embodiment, the protruded portion 15 for alignment is formed to the fiber holding portion 11 of the connector plug 6, and the depressed portion 29 for alignment is formed to the fiber holding portion 25 of the connector socket 8, alternatively, such a configuration that a protruded portion for alignment is provided to the connector socket 8 and a depressed portion for alignment is provided to the connector plug 6 may be used. Besides, although the latch 12 is provided to the connector plug 6 and the windows for locking receiving 37 are formed to the connector socket 8, windows for locking receiving may be formed to the connector plug 6.

Next, a method of assembling the optical connector 1 configured as mentioned above will be described. First, the fiber cables 2, 4, the connector plug 6, the connector socket 8 and the cable fixing members 7, 9 are prepared.

Then the armor 2a at front edge part of the fiber cable 2 is removed to expose the coated optical fiber 3. On this occasion, an exposed portion of the coated optical fiber 3 is in such a state that a bared fiber is covered by a resin-coating. Subsequently, the front edge part of the coated optical fiber 3 is cut while the resin-coating of the coated optical fiber 3 is remained, and further a front edge surface of the coated optical fiber 3 is polished. In similar, the armor 4a at front edge part of the fiber cable 4 is removed to expose a part of the coated optical fiber 5, the front edge part of the coated optical fiber 5 is cut while the resin-coating of the coated optical fiber 5 is remained, and further a front edge surface of the coated optical fiber 5 is polished.

Figure 9:
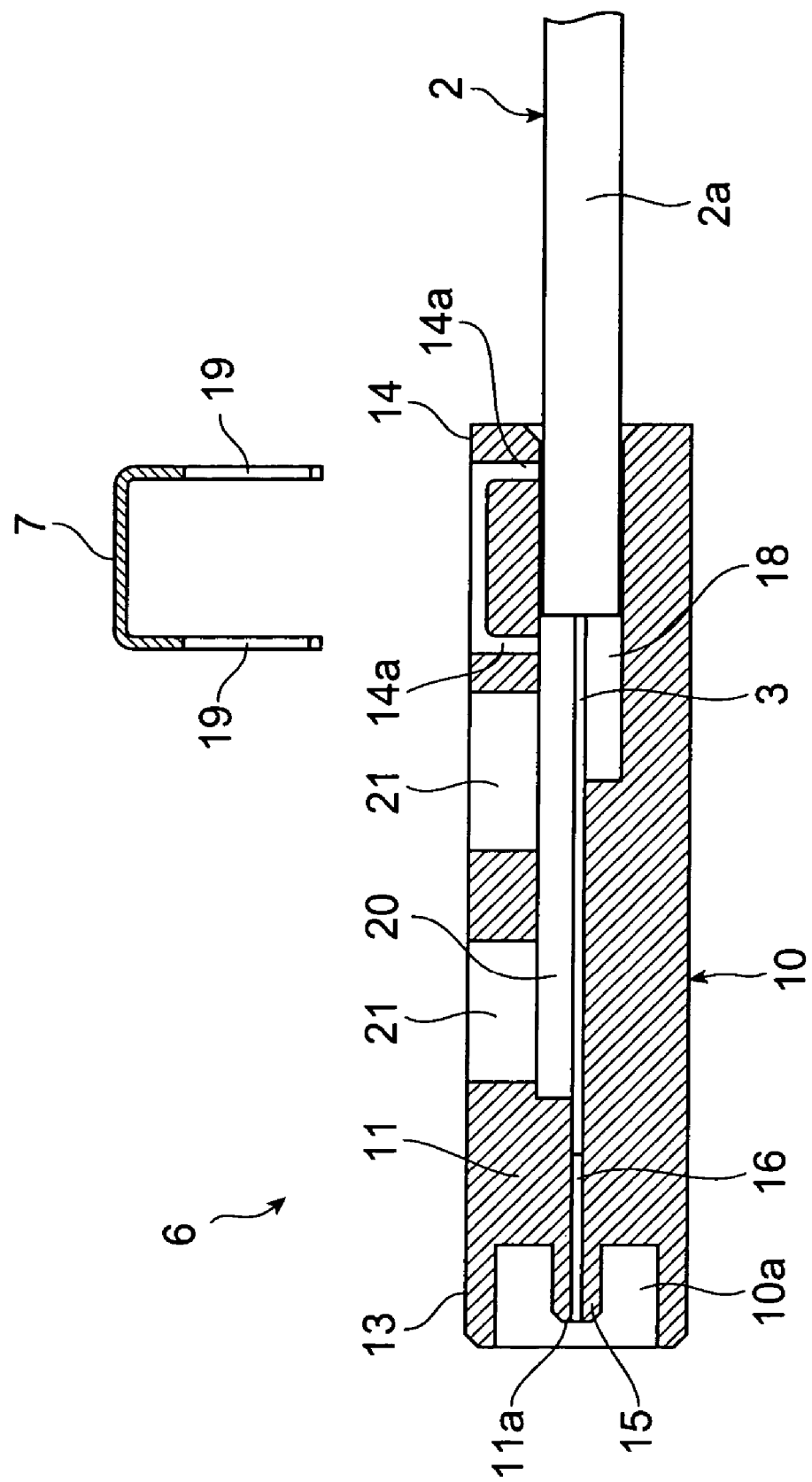
FIG. 9 is a vertical sectional view showing a state where the coated optical fiber is assembled to the connector plug shown in FIG. 2.

The coated optical fiber 3 is then assembled to the connector plug 6. In particular, as shown in FIG. 9, the coated optical fiber 3 is inserted from the rear side of the connector plug 6 into the plug housing 10, and further the coated optical fiber 3 is inserted into the fiber inserting hole 16 while a front edge of the coated optical fiber 3 is guided along the guide groove 17.

Figure 10:
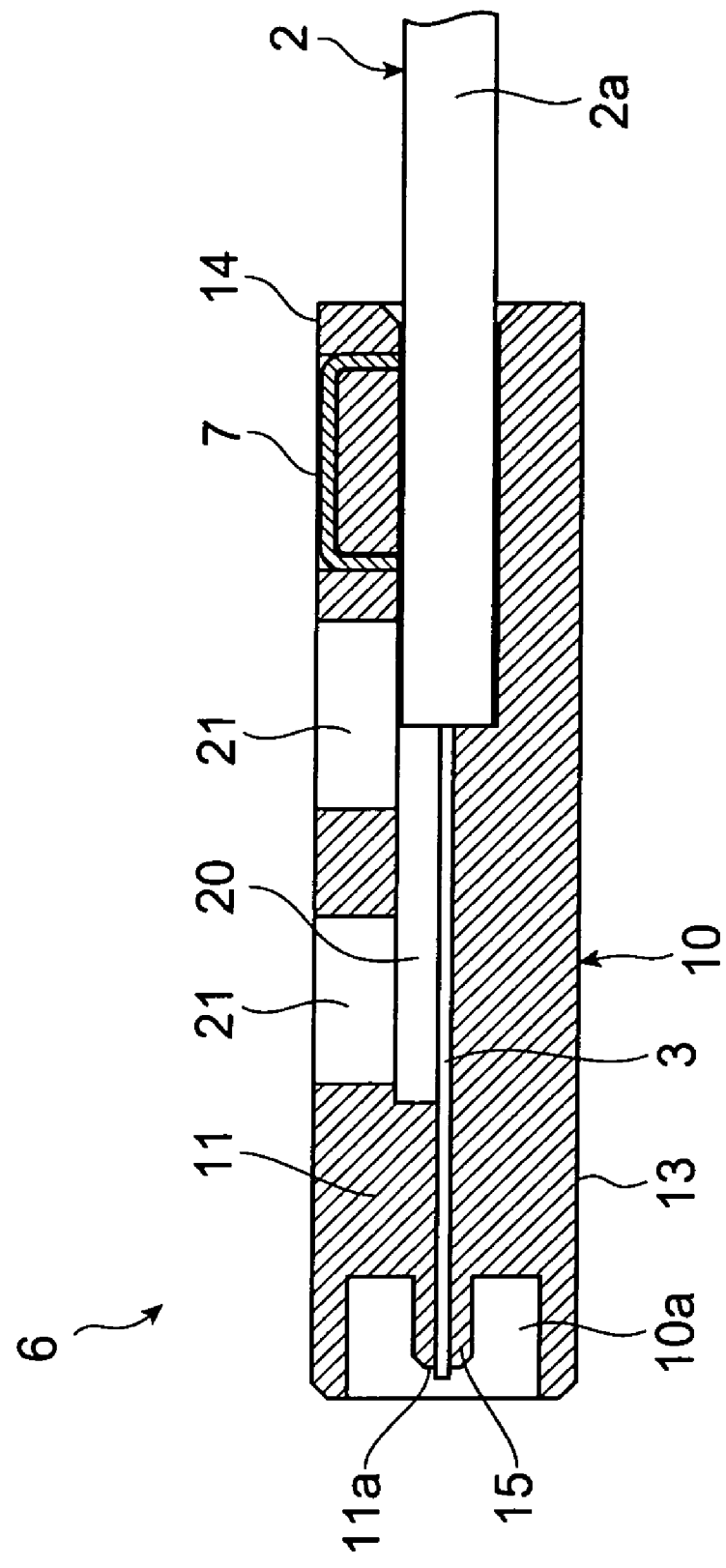
FIG. 10 is a vertical sectional view showing a state where the coated optical fiber is assembled to the connector plug shown in FIG. 2.

Then, as shown in FIG. 10, the fiber cable 2 is fixed to the plug housing 10 by the cable fixing member 7 while the coated optical fiber 3 is slightly protruded from the butted surface 11a (front edge surface of the protruded portion 15 for alignment) of the fiber holding portion 11. In particular, each of leg parts 19 of the cable fixing member 7 is inserted from the upper into the hole part 14a of the cable fixing portion 14 to allow a blade of each of the leg parts 19 cut into the armor 2a of the fiber cable 2. With this manipulation, the connector plug 6 with the coated optical fiber 3 being attached is obtained.

Figure 11:
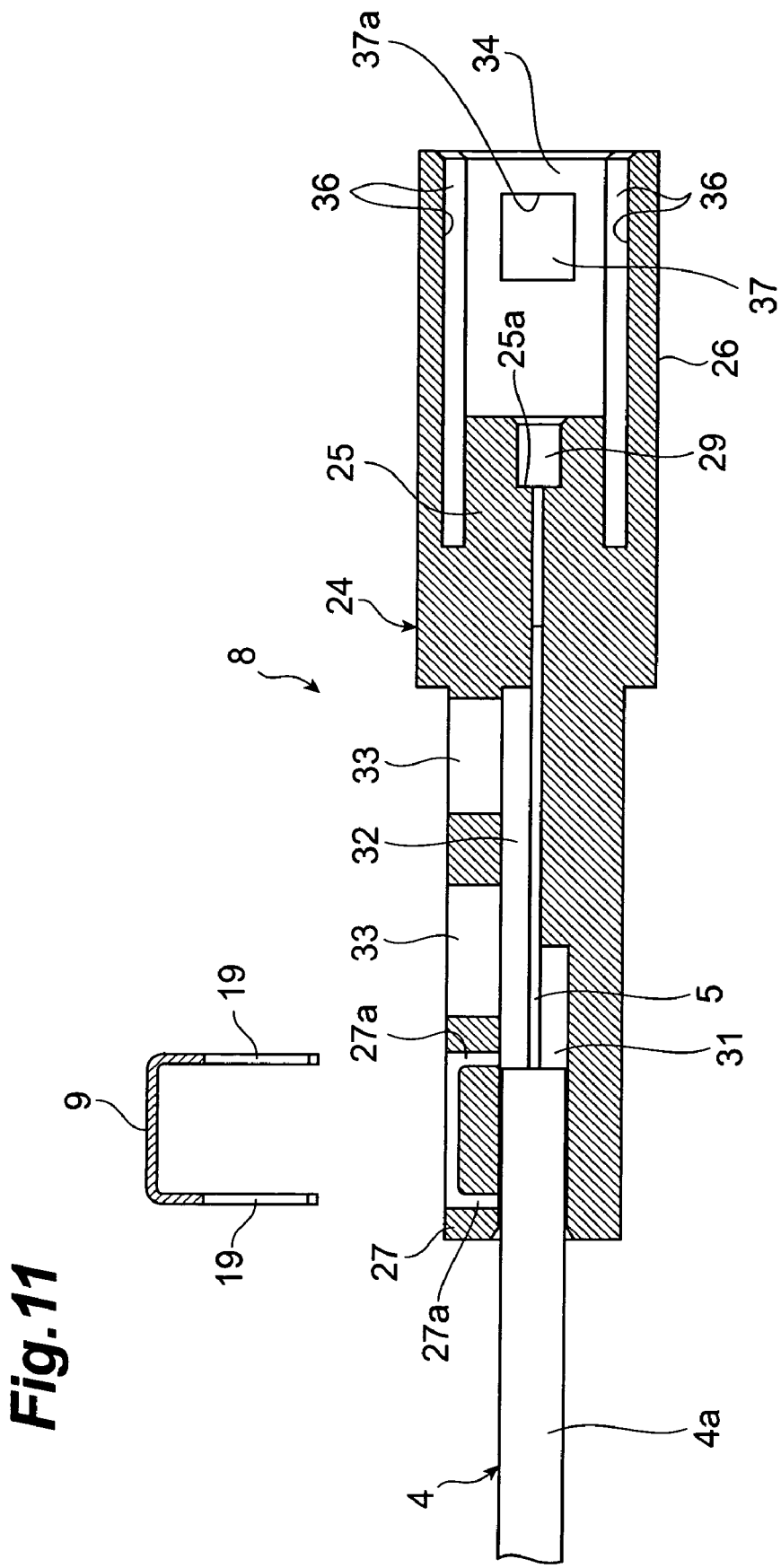
FIG. 11 is a vertical sectional view showing a state where the coated optical fiber is assembled to the connector socket shown in FIG. 6.

Furthermore, the coated optical fiber 5 is assembled to the connector socket 8. In particular, as shown in FIG. 11, the coated optical fiber 5 is introduced from the rear side of the connector socket 8 into the socket housing 24, and the coated optical fiber 5 is inserted into the fiber inserting hole 28 while a front edge of the coated optical fiber 5 is guided along the guide groove 30.

Figure 12:
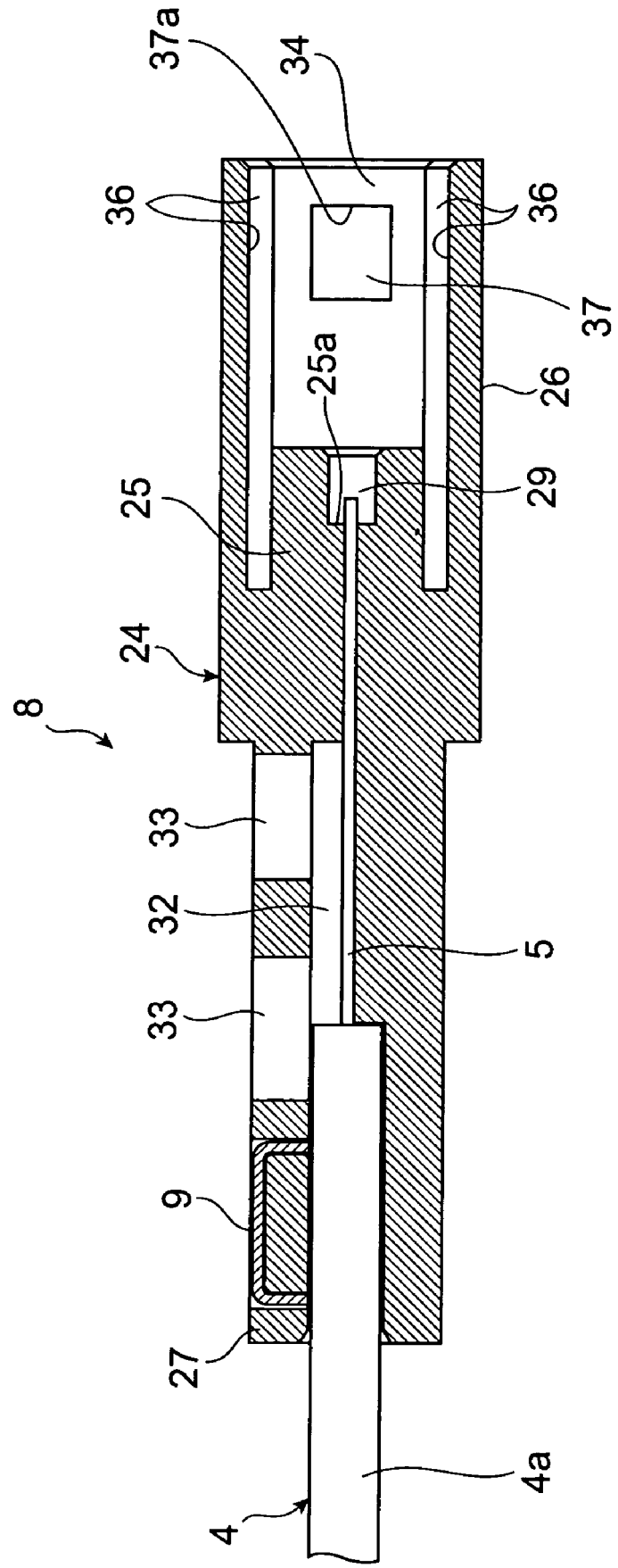
FIG. 12 is a vertical sectional view showing a state where the coated optical fiber is assembled to the connector socket shown in FIG. 6.

Then, as shown in FIG. 12, the fiber cable 4 is fixed to the socket housing 24 by the cable fixing member 9 while the coated optical fiber 5 is slightly protruded from the butted surface 25a (bottom face of the depressed portion 29 for alignment) of the fiber holding portion 25. With this manipulation, the connector plug 8 with the coated optical fiber 5 being supported is obtained.

Figure 13:
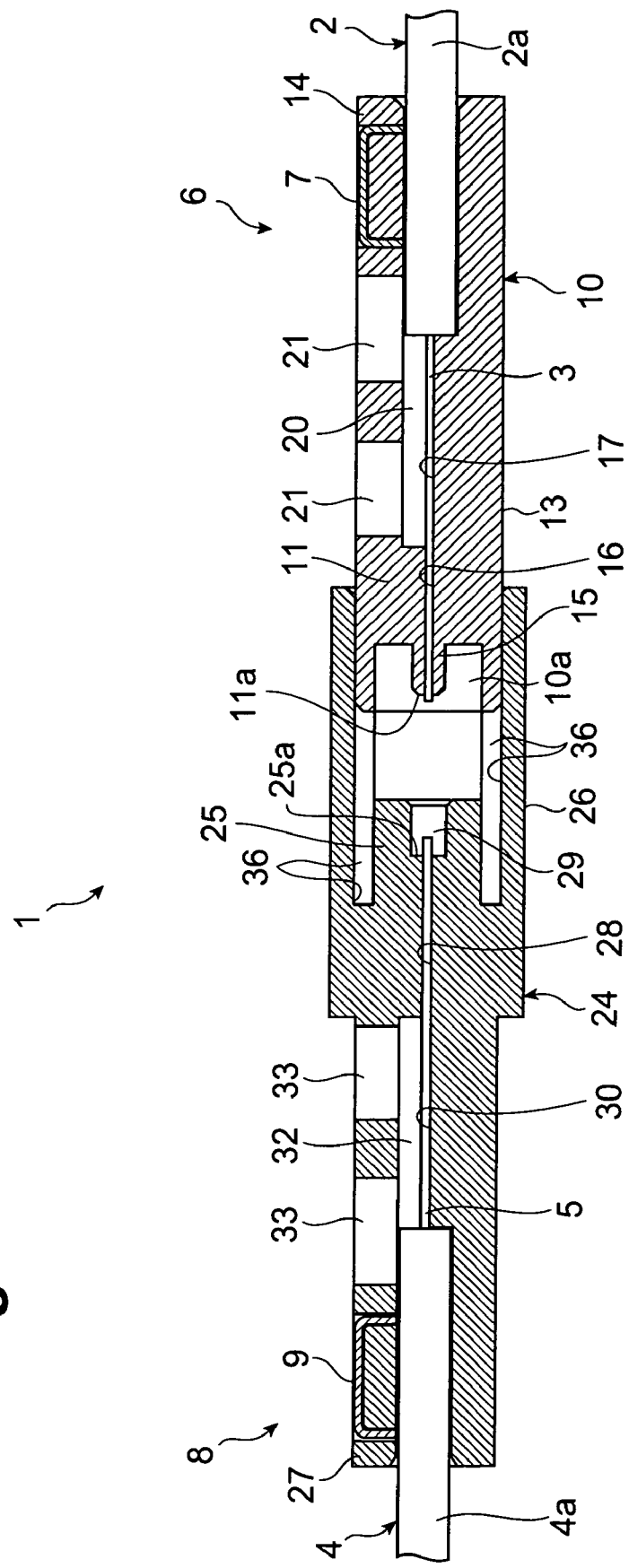
FIG. 13 is a vertical sectional view showing a state where the connector plug depicted in FIG. 10 and the connector socket shown in FIG. 12 are connected.

Next, when coated optical fibers 3, 5 themselves are butted and connected, a forward end surface of the connector plug 6 and a forward end surface of the connector socket 8 are made to face each other. Then, the grabbing part 22 of each of latches 12 in the connector plug 6 is grabbed by fingers and the plug housing 10 of the connector plug 6 is introduced into the socket housing 24 of the connector socket 8 while each of latches 12 is pressed into inside of the connector plug 6 in width direction (side face side of the housing body 13), as shown in FIG. 13. On this occasion, front edge side portion of the housing body 13 of the connector plug 6 is inserted into the plug housing receptor portion 34 of the socket housing 24, and each of latches 12 is inserted into the latch receptor portion 35 of the socket housing 24.

Figure 14:
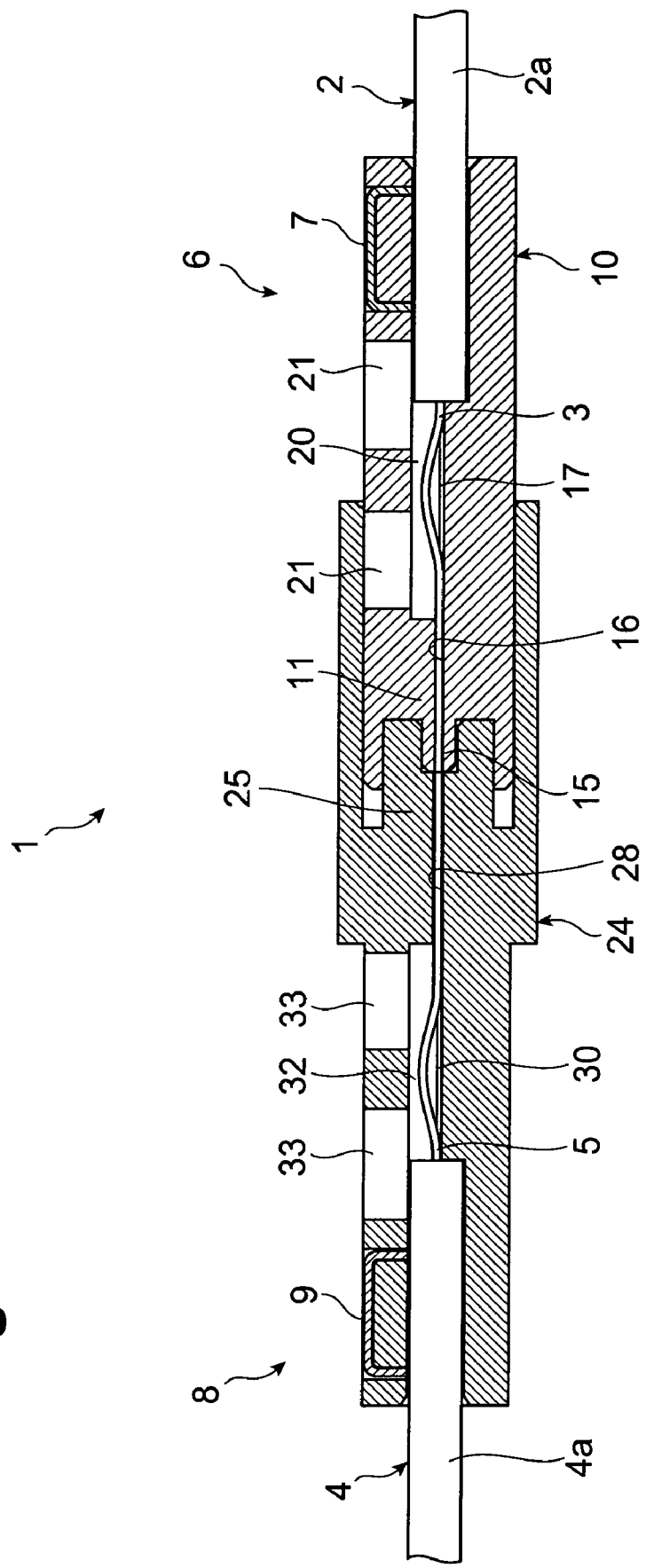
FIG. 14 is a vertical sectional view showing a state where the connector plug depicted in FIG. 10 and the connector socket shown in FIG. 12 are connected.

Then, as shown in FIG. 14, the protruded portion 15 for alignment of the fiber holding portion 11 is inserted into the depressed portion 29 for alignment of the fiber holding portion 25 by further pressing the housing body 13 along the guide surface 36 of the socket housing 24, and the front end surface 11a of the protruded portion 15 for alignment is struck against the bottom face 25a of the depressed portion 29 for alignment.

Figure 15:
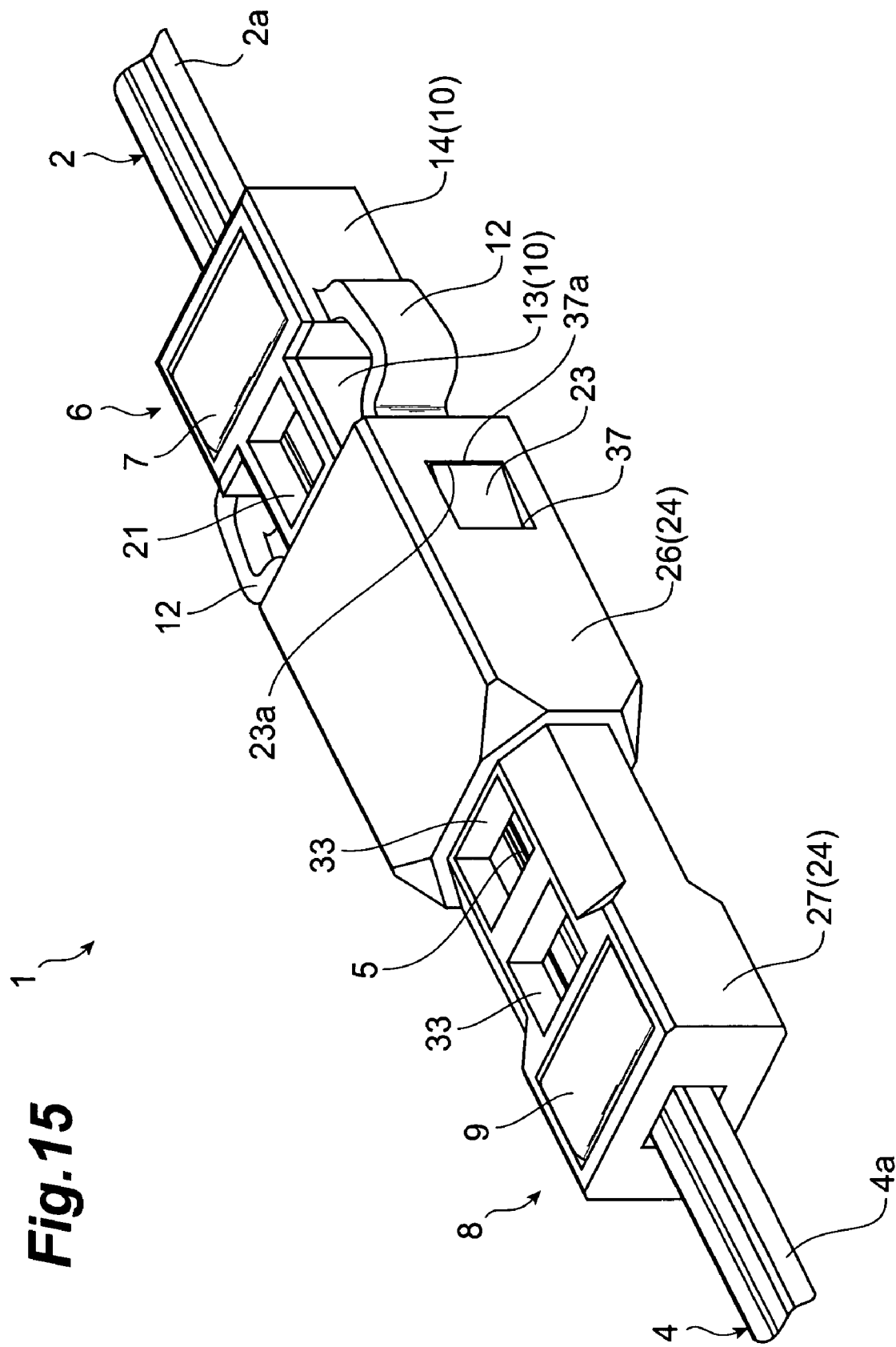
FIG. 15 is a perspective view showing a state where the connector plug depicted in FIG. 10 and the connector socket shown in FIG. 12 are connected.

On this occasion, the locking pawl 23 of each of latches 12 reaches a position corresponding to the window for locking receiving 37 being formed to the socket housing 24 as mentioned above. Therefore, as shown in FIG. 15, each of latches 12 expands by elastic force to outside of width direction of the connector plug 6 trying to return to initial state, each of the locking pawls 23 is caught by each of the windows for locking receiving 37, and the connector plug 6 and the connector socket 8 are brought to locked state. In this state, the plug housing 10 is being restrained to the socket housing 24 in up and down, and right and left directions by the guide surface 36 and therefore, the strength against bending moment generated, for example, when the fiber cables 2, 4 are pulled is improved.

Before the connector plug 6 is mounted to the connector socket 8, a front edge part of the coated optical fiber 3 is slightly projected from the front end surface 11a of the protruded portion 15 for alignment, as described above, and a front edge part of the coated optical fiber 5 is slightly projected from the bottom face 25a of the depressed portion 29 for alignment. In addition, the fiber deflection space 20 is formed inside the plug housing 10 as described above, and the fiber deflection space 32 is formed inside the socket housing 24.

Therefore, when the front end surface 11a of the protruded portion 15 for alignment is struck against the bottom face 25a of the depressed portion 29 for alignment, a protrusion part of the coated optical fiber 3 is shifted to the rear of the plug housing 10 as shown in FIG. 14 and coated optical fibers 3, 5 themselves are connected (united) while a protrusion part of the coated optical fiber 5 is shifted to the rear of the socket housing 24. Then amount of retraction of the coated optical fiber 3 is absorbed by the fiber deflection space 20 thereby deflecting the coated optical fiber 3 upwardly, and amount of retraction of the coated optical fiber 5 is absorbed by the fiber deflection space 32 thereby deflecting the coated optical fiber 5 upwardly. In this case, amount of protrusion of the coated optical fibers 3, 5 is converted to a deflection force of the coated optical fibers 3, 5 and a deflection force of the coated optical fibers 3, 5 results in a binding force of the coated optical fibers 3, 5 themselves. Here, in order to secure a desired bending radius of the coated optical fibers 3, 5 when the coated optical fibers 3, 5 are deflected while maintaining a binding force of the coated optical fibers 3, 5 themselves at high level, protrusion amount of the coated optical fibers 3, 5 is preferably in a range of 0.01 to 1.00 mm.

Alternatively, the coated optical fiber 3 alone may be projected from the front end surface 11a of the protruded portion 15 for alignment or the coated optical fiber 5 alone may be protruded from the bottom face 25a of the depressed portion 29 for alignment. In this case, in order to secure a sufficient binding force of the coated optical fibers 3, 5 themselves, it is necessary to set appropriately an amount of protrusion of either of the coated optical fibers 3, 5 depending on position of a front end of the other of the coated optical fibers 3, 5.

When the connector plug 6 is removed from the connector socket 8, the plug housing 10 is pulled out from inside of the socket housing 24 while each of latches 12 is being pressed into inside of width direction of the connector plug 6.

In the embodiment as described above, the coated optical fiber 3 is inserted into a fiber inserting hole 16 of the connector plug 6 while the resin-coating of the coated optical fiber 3 is remained, the coated optical fiber 5 is inserted into a fiber inserting hole 28 of the connector socket 8 while the resin-coating of the coated optical fiber 5 is remained, and the coated optical fibers 3, 5 themselves are butt-connected with this state, and therefore, there is no need for cleaning such as wiping-off covering refuse or the like in addition to that removal of the covering of the coated optical fibers 3, 5 is not required. In this configuration, assembly of the coated optical fiber 3 to the connector plug 6 and assembly of the coated optical fiber 5 to the connector socket 8 can be made simply. Therefore, workability relating to assembly of the optical connector 1 is improved.

Furthermore, since a work for removing each resin-coating of the coated optical fibers 3, 5 is unnecessary, such a drawback that a worker touches a bared fiber in exposed state and the coated optical fibers 3, 5 are damaged can be prevented. Besides, when the butted surface 11a of the fiber holding portion 11 and the butted surface 25a of the fiber holding portion 25 are butted, the coated optical fibers 3, 5 themselves are connected in stable fashion while the coated optical fibers 3, 5 are being deflected, it is neither necessary to secure by bonding the coated optical fiber 3 to the connector plug 6 nor to secure by bonding the coated optical fiber 5 to the connector socket 8. Therefore, such a drawback that a stress is applied to the coated optical fibers 3, 5 due to absorption of moisture in the air by an adhesive agent and eventual expansion resulting in a disconnection of the coated optical fibers 3, 5 can be avoided. With this consideration, it is possible to obtain the optical connector 1 with improved reliability.

Further, since the optical connector 1 according to this embodiment includes only four parts, namely, the connector plug 6, the connector socket 8 and the cable fixing members 7, 9 in addition to the fiber cables 2, 4, reduction of costs incurred by the optical connector 1 can be reduced.

Figure 16:
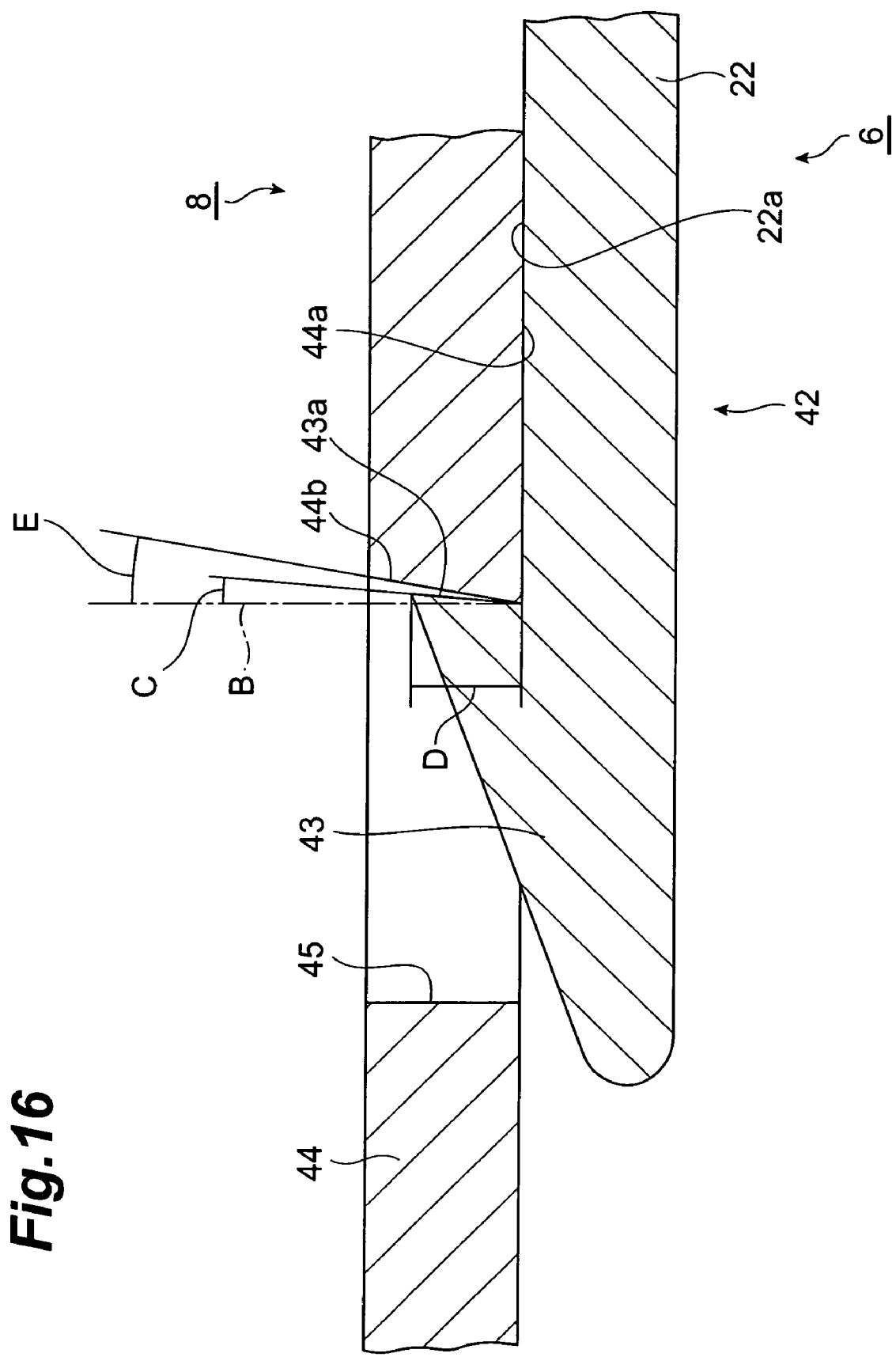
FIG. 16 is an enlarged sectional view showing a locked state of a second embodiment of an optical connector according to the present invention.

Next, a second embodiment of an optical connector according to the present invention will be described referring to FIG. 16. FIG. 16 is an enlarged sectional view of a second embodiment of an optical connector in locked state according to the present invention. The difference between the optical connector according to the second embodiment and the optical connector according to the first embodiment is a configuration of a locking pawl (locking portion) and a window for locking receiving (locking receiving portion) as a fixing structure for detachably fixing a connector plug 6 and a connector socket 8. In the drawing, members same as or equivalent to those in the first embodiment are identified by the same symbols and explanation thereof will be omitted.

The connector plug 6 has a pair of latches 42 in lieu of the pair of latches 12 in the above-mentioned first embodiment. A locking pawl 43 is provided at front end of the latch 42. The connector socket 8 has a housing body 44 in lieu of the housing body 26 in the first embodiment, and a window for locking receiving 45 is provided to the housing body 44. Here, in FIG. 16, one of the latches 42 and one of the windows for locking receiving 45 are depicted.

The locking pawl 43 has a sloping surface (hooking surface) 43a forming a predetermined angle C with respect to a virtual surface B orthogonal to an outside surface 22a (surface outside of width direction) of a grabbing part 22. Particularly, the sloping surface 43a is tilted to the rear of the connector plug 6 with respect to the virtual surface B (to the right in the drawing) by, for example, five degrees. In other words, an angle formed by the outside surface 22a of the grabbing part 22 and the sloping surface 43a is an acute angle.

Further, an amount of protrusion D of the locking pawl 43 (length from outside surface 22a of grabbing part 22 to end of sloping surface 43a) is set to, for example, 0.85 mm.

The housing body 44 constitutes a part of the windows for locking receiving 45 and has a sloping surface 44b (surface to be hooked) to form a predetermined angle E with respect to the virtual surface B that is orthogonal to an interior surface 44a of the housing 44. In particular, the sloping surface 44b is tilted by, for example, 10 degrees in the same direction of the sloping surface 43a of the locking pawl 43 with respect to the virtual surface B. Incidentally, as for materials constituting the latch 42 and the housing body 44 having the window for locking receiving 45, PBT containing, for example, 20% of glass filler is preferably used.

In a state where the connector plug 6 and the connector socket 8 are fixed mutually, the locking pawl 43 of the connector plug 6 engages with the window for locking receiving 45 of the connector socket 8 and the sloping surface 43a of the locking pawl 43 is hooked to the sloping surface 44b of the housing body 44. In this state, the coated optical fiber 3 held by the connector plug 6 (see previous drawing) and the coated optical fiber 5 held by the connector socket 8 (see previous drawing) are connected being butted each other.

In the optical connector according to the second embodiment, since both a hooking surface 43a of the locking pawl 43 and a surface to be hooked 44b of the housing body 44 are configured to be a sloping surface, a binding force of the connector plug 6 and the connector socket 8 is improved. For example, it is possible to increase the binding force of the two to sufficiently high level, for example, approximately 100 N. In this configuration, this connector is particularly effective to be used as an optical connector mounted on automobiles.

Figure 17:
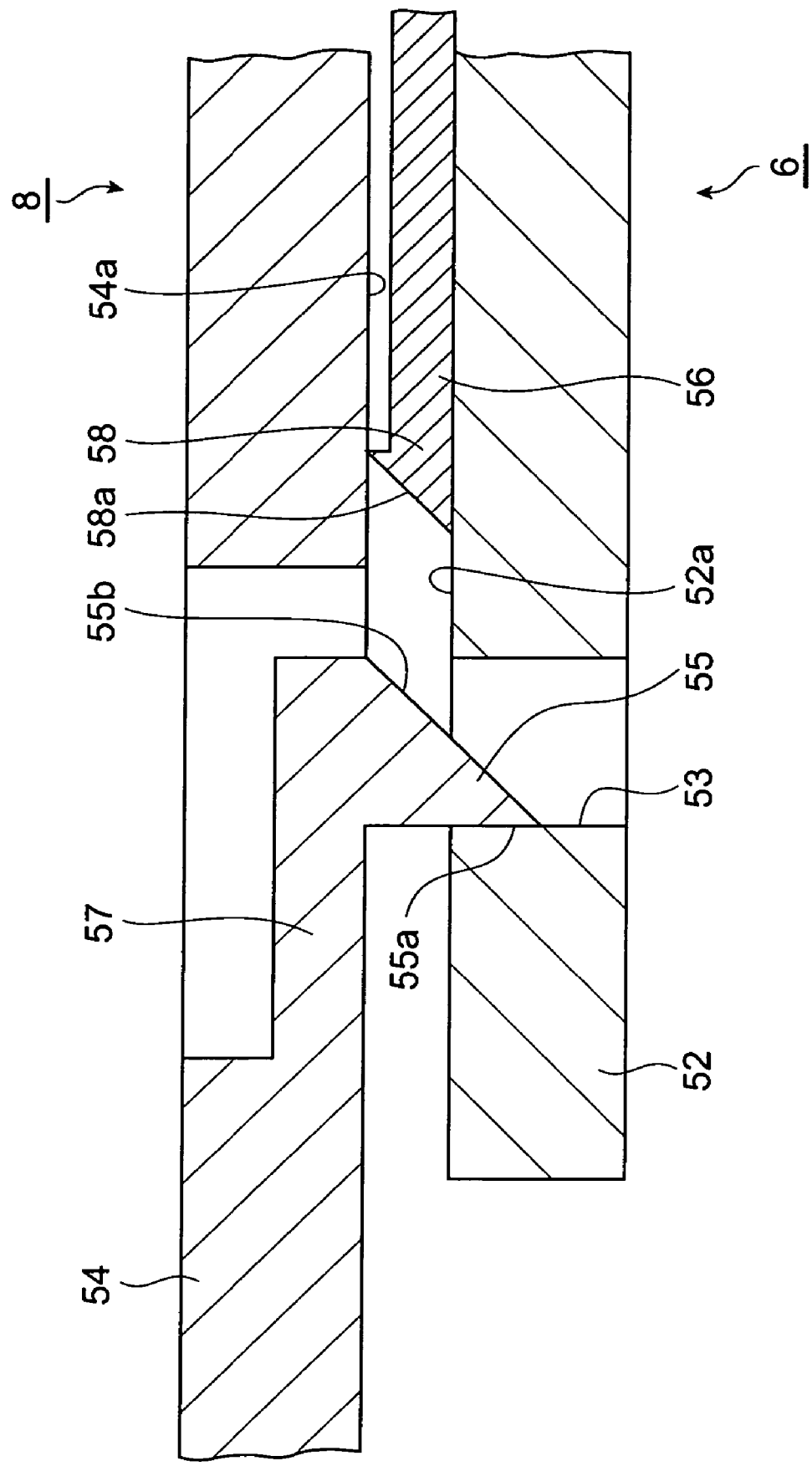
FIG. 17 is an enlarged sectional view showing a locked state of a third embodiment of an optical connector according to the present invention.

Next, a third embodiment of an optical connector according to the present invention will be described referring to FIG. 17. FIG. 17 is an enlarged sectional view of a locked state of a third embodiment of an optical connector according to the present invention. The difference between the optical connector according to the third embodiment and the optical connector according to the first embodiment is a structure of a fixing structure for fixing a connector plug 6 and a connector socket 8. In the drawing, members same as or equivalent to those in the first embodiment are identified by the same symbols and explanation thereof will be omitted.

The connector socket 8 has a housing body 54 in lieu of the housing body 26 in the embodiment mentioned above, and a latch 57 extending backwardly is connected to the housing body 54. A locking pawl 55 is provided to front end of the latch 57 for locking the connector 6 to the connector socket 8. The locking pawl 55 has a hooking surface 55a and a sloping surface 55b tilted with respect to this hooking surface 55a. The latches 57 are provided at both sides of the housing body 54 and are elastically deformable with respect to width direction of the housing body 54.

The connector plug 6 has a housing body 52 in lieu of the housing body 13 in the first embodiment mentioned above, and a window for locking receiving 53 for engaging with the latches 57 is provided to the housing body 52. The windows for locking receiving 53 are provided at both ends of the housing body 52.

In a state where the connector plug 6 and the connector socket 8 are fixed mutually, the locking pawl 55 of the connector socket 8 engages with the window for locking receiving 53 of the connector plug 6, and the hooking surface 55a of the locking pawl 55 is hooked from outside of the housing body 52 to the window for locking receiving 53. In this state, the coated optical fiber 3 held by the connector plug 6 (see previous drawing) and the coated optical fiber 5 held by the connector socket 8 (see previous drawing) are connected being butted each other.

When such a locked state of the connector plug 6 and the connector socket 8 is to be released, two ejectors 56 to be used as the jig are prepared. A lock releasing pawl 58 having a sloping surface 58a is provided at front end of the ejector 56. Then, the ejector 56 is inserted from the rear into a clearance between an interior surface 54a of the housing body 54 and an exterior surface 52a of the housing body 52 and is moved forwardly to butt the lock releasing pawl 58 to the locking pawl 55 of the latch 57. Then, the locking pawl 55 is moved outside of width direction against a biasing force of the latch 57 while the sloping surface 55b of the locking pawl 55 is pushed by the sloping surface 58a of the lock releasing pawl 58, thereby releasing locked state of the connector plug 6 and the connector socket 8. In this state, the connector plug 6 is detached from the connector socket 8.

In the optical connector according to the third embodiment, the latch 57 is not opened to outside unless the ejector 56 is used, and therefore, a locked state of the connector plug 6 and the connector socket 8 will not be released accidentally even if a force is applied from outside to the locking pawl 55. Besides, since the latch 57 is provided inside the connector socket 8, it is possible to prevent, in such a working environment where a plurality of fiber cables are bundled as is the case of, for example, automobiles, a fiber cable from being sandwiched from outside by a latch part.

Although in this embodiment, two ejectors 56 are prepared to be used as the jig for lock releasing, alternatively, for example, a cylindrical ejector having a pair of lock releasing pawls to be engaged with the locking pawl 55 of the latch 57 may be attached in advance to the connector plug 6.

Figure 18:
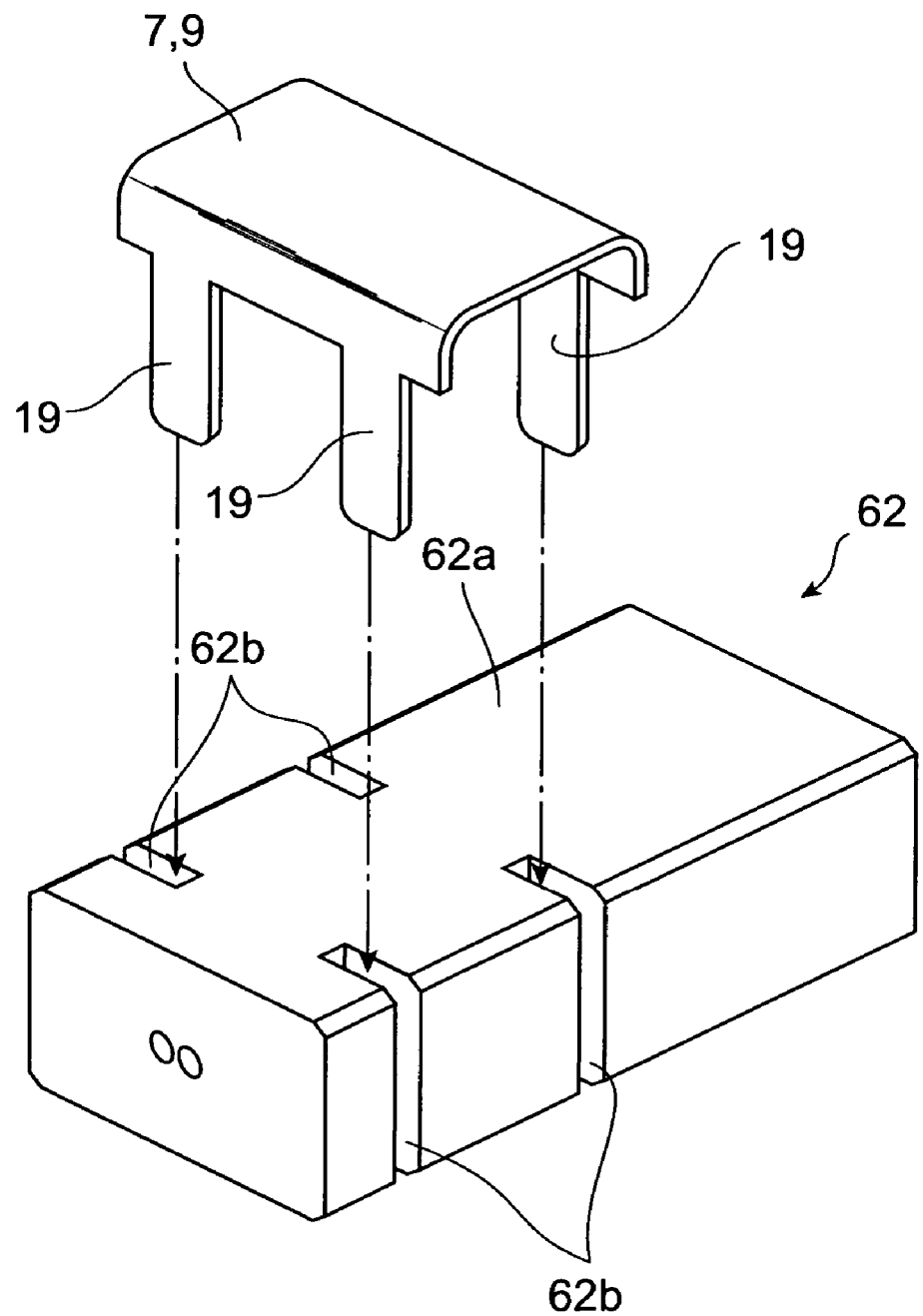
FIG. 18 is a perspective view showing a fiber cable in a fourth embodiment of an optical connector according to the present invention.

Next, a fourth embodiment of an optical connector according to the present invention will be described referring to FIG. 18. FIG. 18 is a perspective view showing a fiber cable in a fourth embodiment of an optical connector according to the present invention. In FIG. 18, members same as or equivalent to those in the first embodiment are identified by the same symbols and explanation thereof will be omitted.

In a fixing area of an armor 62a of a fiber cable 62 used in this embodiment are formed four fixing grooves 62b into which each of legs 19 of the fixing members 7, 9 is inserted. When the fixing members 7, 9 are fixed to such a fiber cable 62, the leg parts 19 of the cable fixing members 7, 9 are inserted from the upper into the fixing grooves 62b of the fiber cable 62, and with this state, each of legs 19 is crimped with respect to the armor 62a of the fiber cable 62. In this configuration, a blade (not shown) of each of legs 19 is being hooked by the armor 62a, thereby fixing the fixing members 7, 9 to the fiber cable 62.

In this case, it is possible to fix surely the fixing members 7, 9 to the armor 62a of the fiber cable 62 with ease by hand alone without using any special tool even if a hard material is used for the fiber cable 62 due to shock resistance reason or the like so that armor 62a may not be deformed easily. Besides, it is capable of withstanding pulling of the fiber cables in, for example, automobile environment, with a small number of components.

Figure 19:
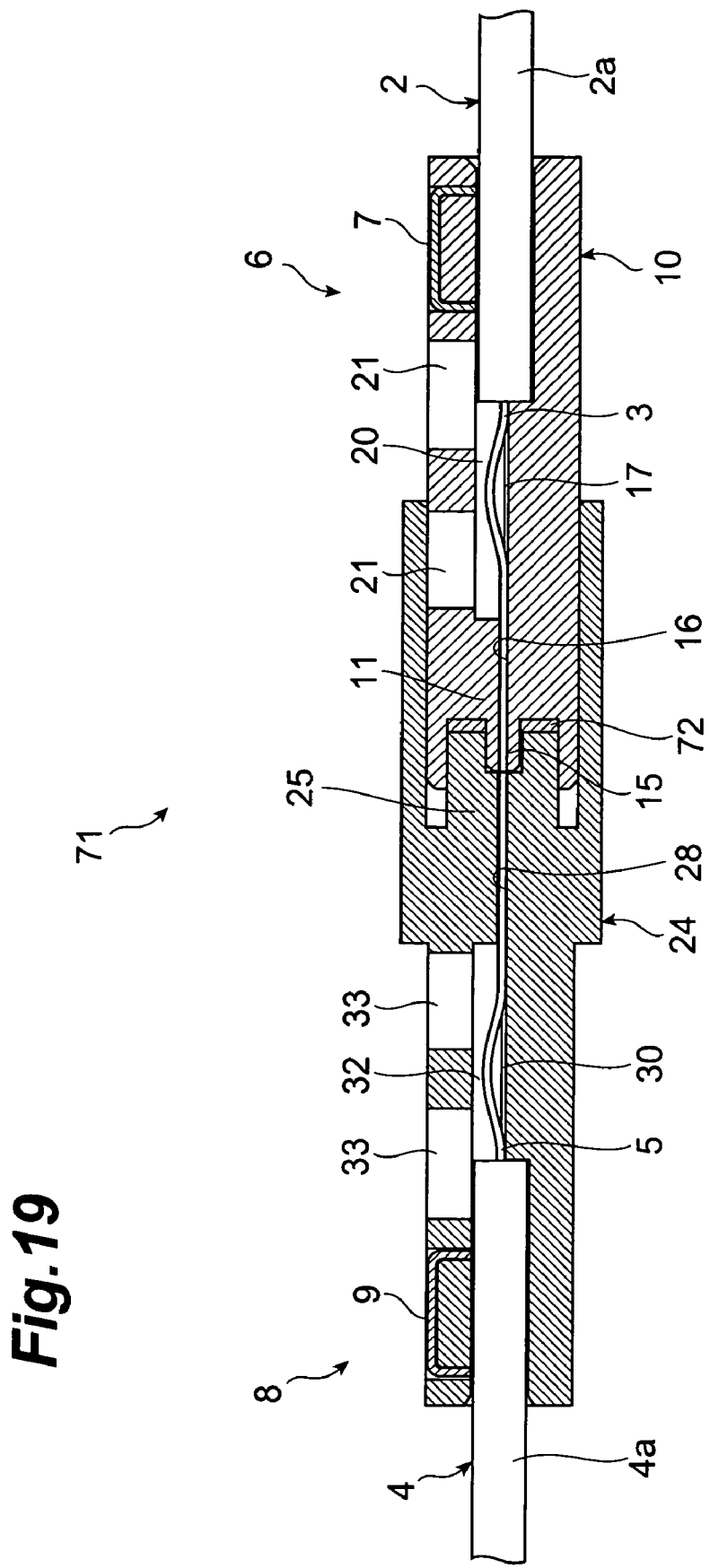
FIG. 19 is a vertical sectional view showing a fifth embodiment of an optical connector according to the present invention.
Figure 20:
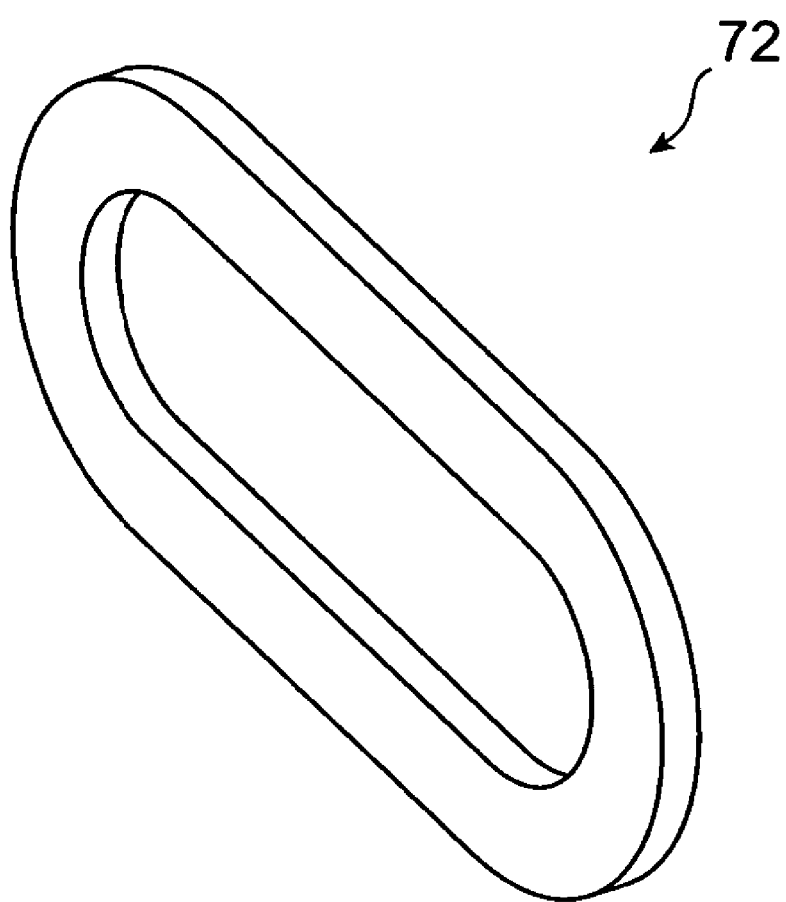
FIG. 20 is a perspective view of the seal member shown in FIG. 19.

Next, a fifth embodiment of an optical connector according to the present invention will be described referring to FIGS. 19 and 20. FIG. 19 is a vertical sectional view showing a fifth embodiment of an optical connector according to the present invention. In FIG. 19, members same as or equivalent to those in the first embodiment are identified by the same symbols and explanation thereof will be omitted.

An optical connector 71 according to the fifth embodiment comprises a seal member 72 for protecting a butted surface of the connector plug 6 and the connector socket 8. The seal member 72 has a ring shape as shown in FIG. 20, and has a profile so as to trace the protruded portion 15 for alignment to allow penetration through the protruded portion 15 for alignment (see FIG. 4). The seal member 72 is mounted to bottom face of a concave 10a that is an outer area of the protruded portion 15 for alignment in the fiber holding portion 11 as shown in FIG. 19. In this configuration, the seal member 72 is, in a state where the connector plug 6 and the connector socket 8 are fixed, interposed so as to enclose the fiber inserting hole 16 between the fiber holding portion 11 and the fiber holding portion 25. With a provision of aforementioned seal member 72, it is possible to provide water-proof and dust-proof features to a butted surface between the connector plug 6 and the connector socket 8.

Interposed position of the seal member is not necessarily limited to the concave 10a, and any portion that encloses the fiber inserting hole 16 or the fiber inserting hole 28 between the fiber holding portion 11 and the fiber holding portion 25, in a state where the connector plug 6 and the connector socket 8 are fixed, may be used.

Figure 21:
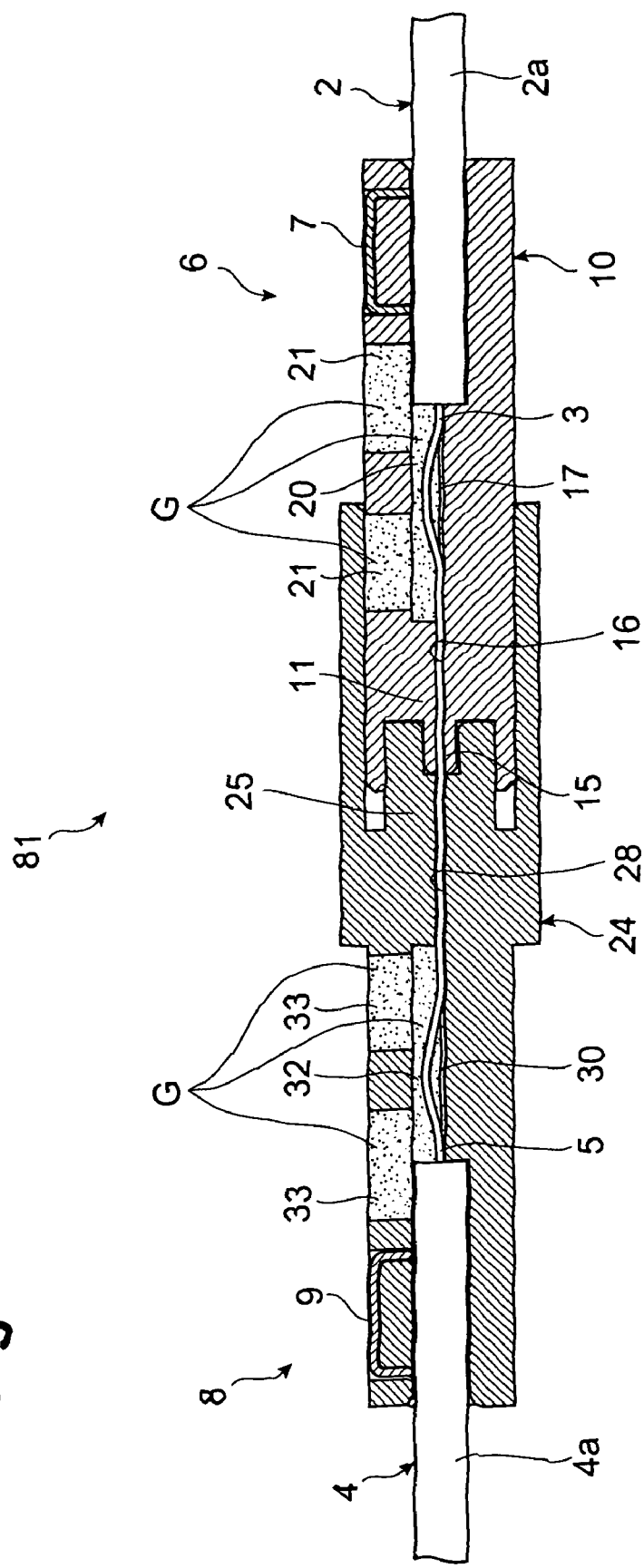
FIG. 21 is a vertical sectional view showing a sixth embodiment of an optical connector according to the present invention.

Next, a sixth embodiment of an optical connector according to the present invention will be described referring to FIG. 21. FIG. 21 is a vertical sectional view showing a sixth embodiment of an optical connector according to the present invention. In FIG. 21, members same as or equivalent to those in the first embodiment are identified by the same symbols and explanation thereof will be omitted.

In the optical connector 81 according to the sixth embodiment, gel G of silicon gel or the like is filled in the window 21 and in the fiber deflection space 20 of the connector plug 6, and in the window 33 and in the fiber deflection space 32 of the connector socket 8. Gel G is deformed by a small load while it has hardness for maintaining shape of gel G itself. Besides, gel G has heat resistance, cold temperature resistance, and humidity resistance.

With a provision of filling such gel G inside the connector plug 6 and the connector socket 8, it is possible to provide water-proof and dust-proof features to a butted surface between the connector plug 6 and the connector socket 8. Further, since deflection portion of the coated optical fibers 3, 5 can be protected from vibrations, this connector is particularly effective to be used as an optical connector mounted on automobiles.

Figure 22:
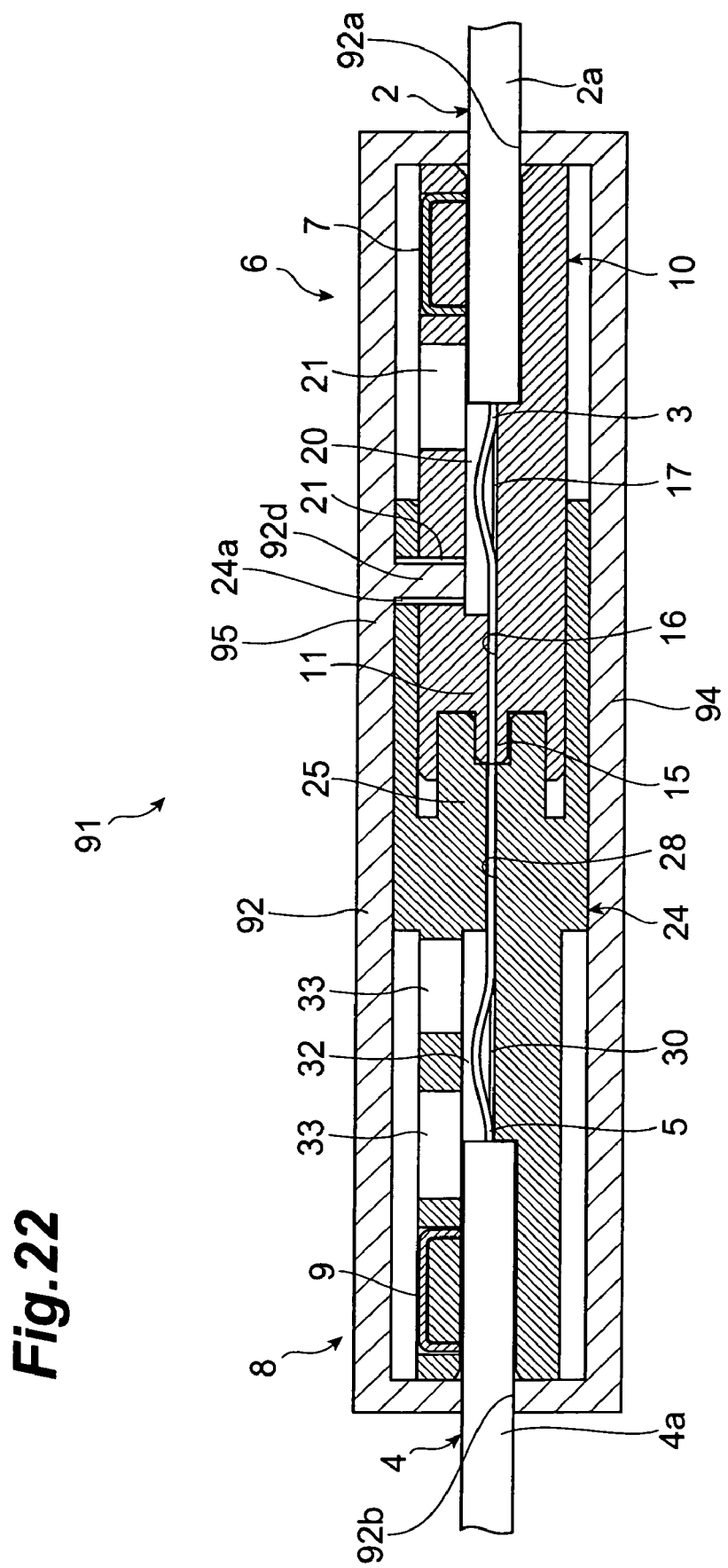
FIG. 22 is a vertical sectional view showing a seventh embodiment of an optical connector according to the present invention.

Next, a seventh embodiment of an optical connector according to the present invention will be described referring to FIGS. 22 and 23. FIG. 22 is a vertical sectional view showing a seventh embodiment of an optical connector according to the present invention. In FIG. 22, members same as or equivalent to those in the first embodiment are identified by the same symbols and explanation thereof will be omitted.

An optical connector 91 according to the seventh embodiment further comprises an outer housing 92 for accommodating the connector plug 6 and the connector socket 8 being fixed mutually in a sealed state.

Figure 23:
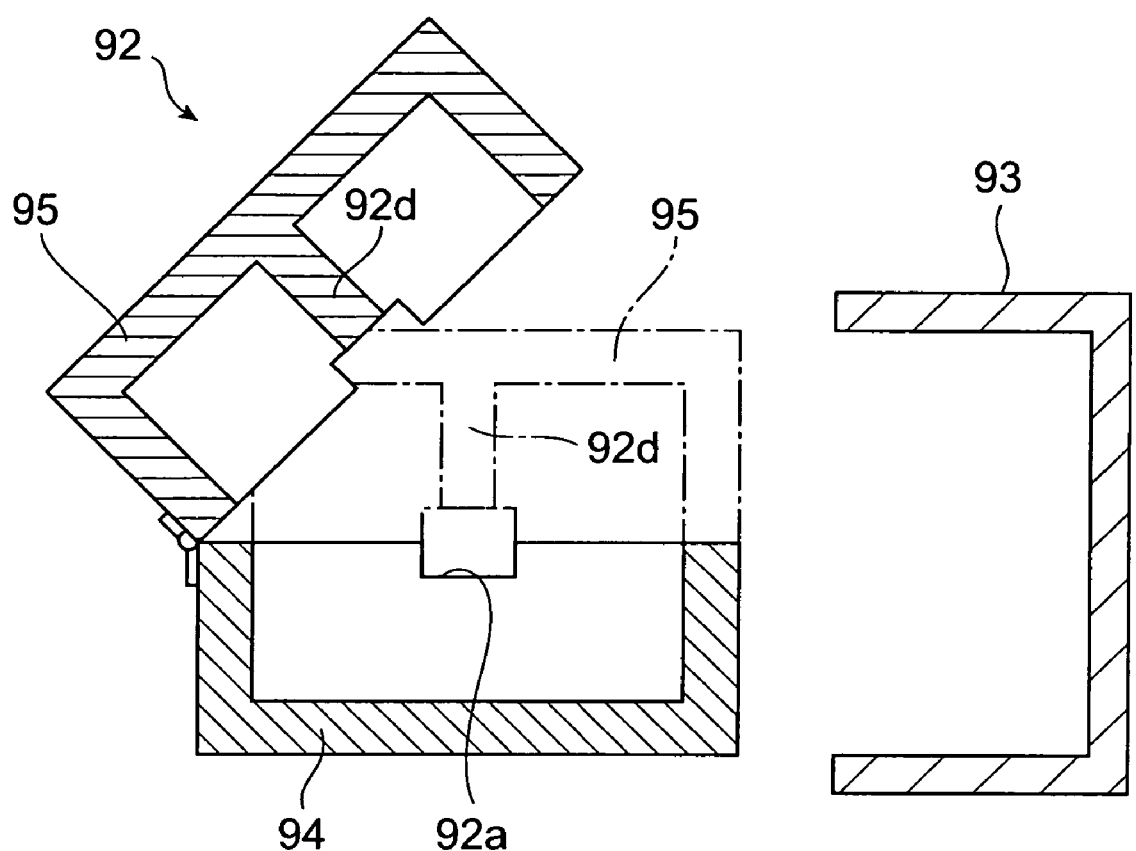
FIG. 23 is a sectional view of the outer housing and the clamp shown in FIG. 22.

As shown in FIG. 23, the outer housing 92 forms an openable and closable box-shape composed of a base member 94 and a lid member 95, which covers the connector plug 6 and the connector socket 8 being fixed mutually and is detachably fixed by a clamp 93. Further, a taking-out portion 92a for taking out the fiber cable 2 outside the outer housing 92 is formed at one end of the outer housing 92, and a taking-out portion 92b for taking out the fiber cable 4 outside the outer housing 92 is formed at the other end of the outer housing 92.

The fiber cable 2 is then taken out from the taking-out portion 92a and the fiber cable 4 is taken out from taking-out portion 92b.

Incidentally, a seal member is preferably interposed between the fiber cables 2, 4, and the housing 92. Further, for fixing of the base member 94 and the lid member 95, screw cramping or the like may be used in addition to aforementioned clamp 93.

Further, a protruded portion 92d projecting inwardly is formed on interior surface of upper wall part of the lid member 95 of the outer housing 92. In a state where the lid member 95 is closed, the protruded portion 92d penetrates in up and down directions through a window part 24a formed to the socket housing 24 of the connector socket 8 and one of windows 21 of the connector plug 6, thereby restraining movements of the connector plug 6 and the connector socket 8 in attaching and detaching directions. With this configuration, improvement of a binding force in the optical connector 91 is attempted.

Since the optical connector 91 is thus protected by the outer housing 92, it is possible to provide water-proof and dust-proof features to a butted surface between the connector plug 6 and the connector socket 8. Further, when the optical connector 91 is mounted on, for example, an automobile and if the fiber cables 2, 4 are pulled, the connector plug 6 and the connector socket 8 will not be disengaged easily by the protruded portion 92d.

Figure 24:
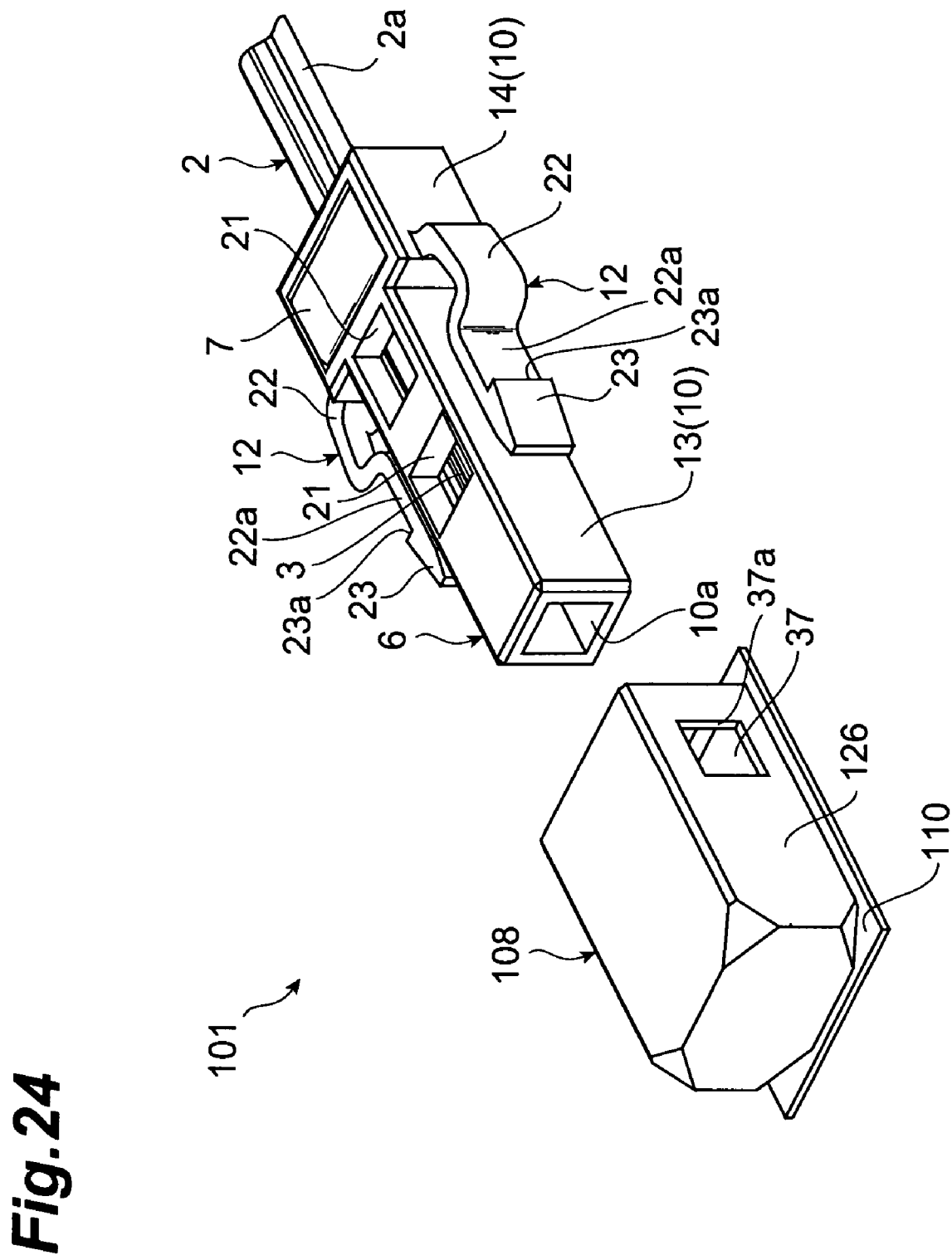
FIG. 24 is a perspective view showing an eighth embodiment of an optical connector according to the present invention.
Figure 25:
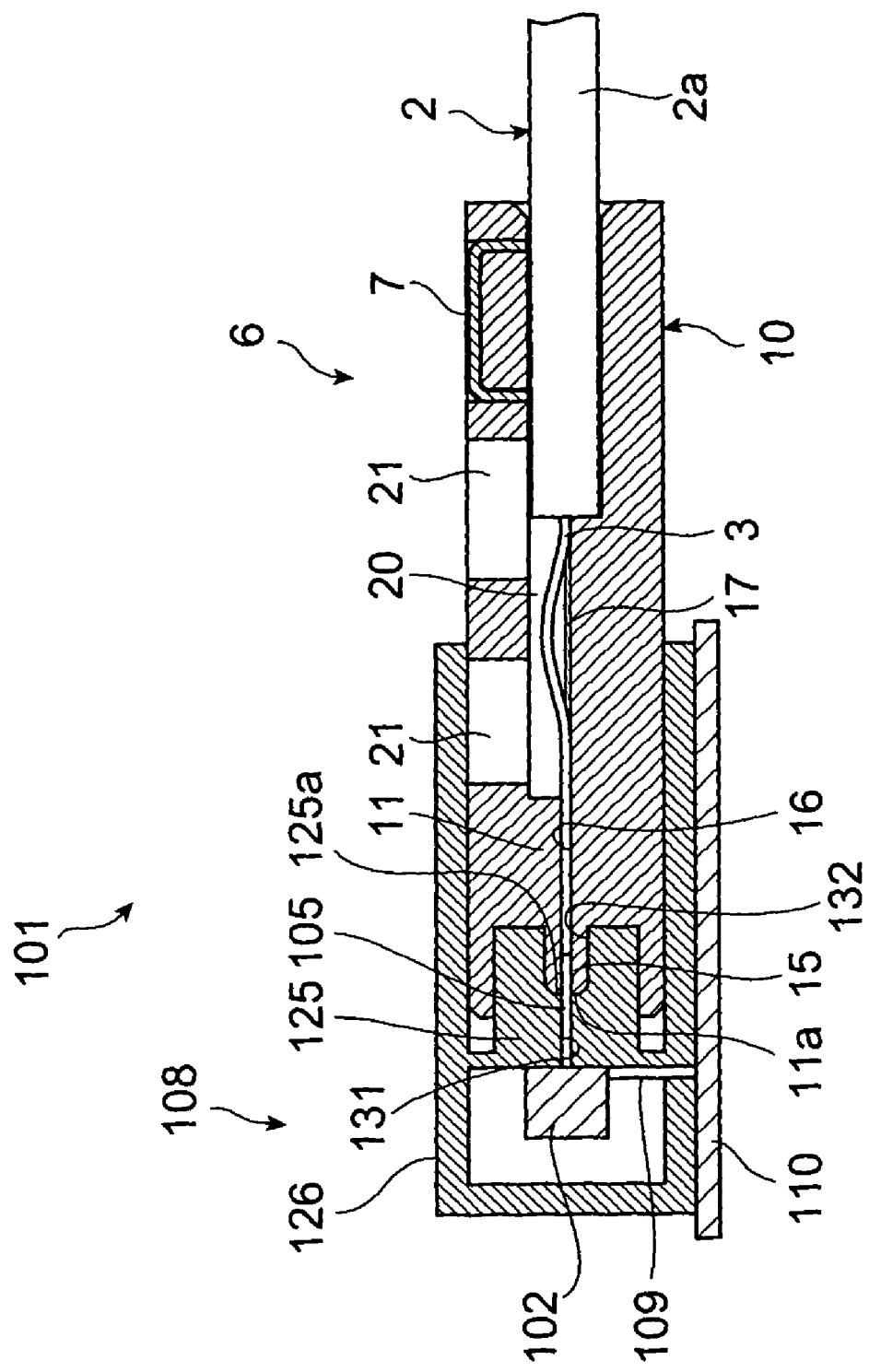
FIG. 25 is a vertical sectional view of the optical connector shown in FIG. 24.

Next, an eighth embodiment of an optical connector according to the present invention will be described referring to FIGS. 24 and 25. FIG. 24 is a perspective view showing an eighth embodiment of an optical connector according to the present invention, and FIG. 25 is a vertical sectional view showing the optical connector shown in FIG. 24. In each of FIGS. 24 and 25, members same as or equivalent to those in the first embodiment are identified by the same symbols and explanation thereof will be omitted. An optical connector 101 according to the eighth embodiment comprises the connector plug 6 with same composition of that of the first embodiment and an optical header 108 detachable with respect to the connector plug 6.

The optical header 108 is provided with a housing 126 having a cross section in nearly rectangular form as shown in FIG. 25. A fiber holding portion 125 for holding two shorter length coated optical fibers 105 and an optical element module 102 connected to the coated optical fiber 3 via the shorter length coated optical fiber 105 are provided inside the housing 126. Two fiber holes 131 into which each of the shorter length coated optical fibers 105 is inserted and a depressed portion 132 for alignment which is communicated with the fiber hole 131 and is engaged with a protruded portion 15 for positioning of the plug housing 10 are provided to the fiber holding portion 125.

The optical element module 102 has a light emitting element (not shown) and a light receiving element (not shown). The light emitting element and the light receiving element are electrically connected to an electric circuit board 110 disposed under the housing 126 via a lead frame 109. Each of the shorter length coated optical fibers 105 is slightly protruded from a butted surface of the fiber holding portion 125 (bottom face of a depressed portion 132 for positioning). One of the shorter length coated optical fibers 105 is optically connected with the light emitting element of the optical element module 102 and the other shorter length coated optical fiber 105 is optically connected with the light receiving element of the optical element module 102. Besides, the windows for locking receiving 37 which engage with the locking pawl 23 of the connector plug 6 are provided at both sides of the housing 126.

When the connector plug 6 is connected with the optical header 108, the plug housing 10 is put into the housing 126, the protruded portion 15 for positioning of the plug housing 10 is inserted into the depressed portion 132 for positioning of the housing 126, and the fiber holding portion 11 and the fiber holding portion 125 are butted. On this occasion, the coated optical fiber 3 will retract and deflect upwardly.

In the eighth embodiment, as mentioned above, the coated optical fiber 3 is inserted into the fiber inserting hole 16 of the connector plug 6 with resin-coating of the coated optical fiber 3 being remained, and the coated optical fiber 3 is butted and connected with the optical element module via the shorter length coated optical fiber 105 with this state. With this manipulation, there is no need for removal of covering of the coated optical fiber 3 and no need for cleaning such as wiping-off covering refuse or the like. In this consideration, assembly of the coated optical fiber 3 to the connector plug 6 can be performed simply. Therefore, workability relating to assembly of the optical connector 101 is improved.

Further, as described above, since a work for removing the resin-coating of the coated optical fibers 3 is unnecessary, such a drawback that a worker touches a bare fiber in exposed state and the coated optical fibers 3 is damaged can be prevented. Besides, when the butted surface 11a of the fiber holding portion 11 is butted with the butted surface 125a of the fiber holding portion 125, the coated optical fibers 3, 105 themselves are connected in stable fashion while the coated optical fiber 3 is being deflected, and therefore, it is not necessary to secure by bonding the coated optical fiber 3 to the connector plug 6. Therefore, such a drawback that a stress is applied to the coated optical fiber 3 due to absorption of moisture in the air by an adhesive agent and eventual expansion resulting in a disconnection of the coated optical fiber 3 can be avoided. With this consideration, it is possible to obtain the optical connector 101 with improved reliability.

Figure 26:
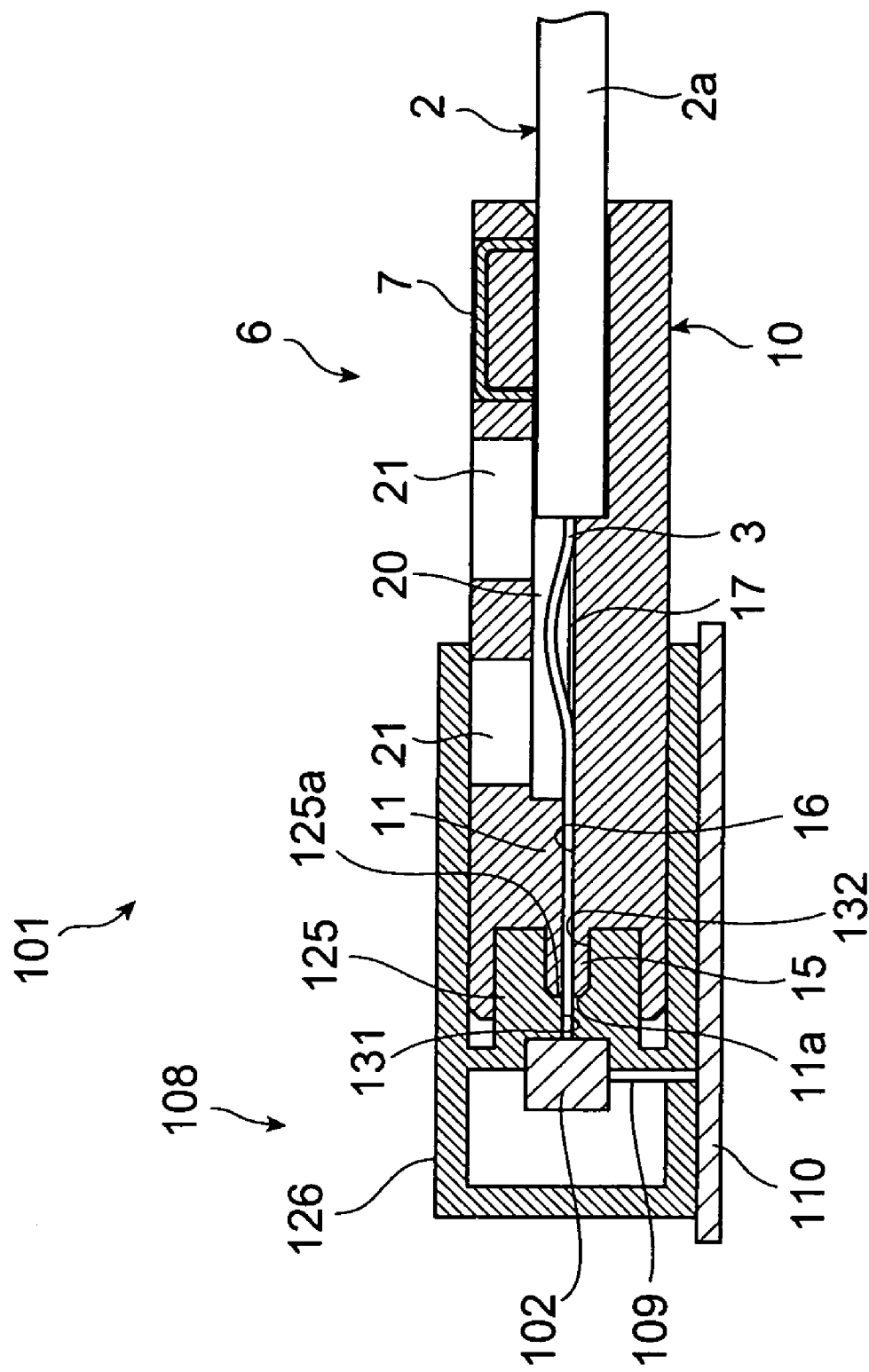
FIG. 26 is a vertical sectional view of a variant of the eighth embodiment of the optical connector according to the present invention.

Although in the above-mentioned eighth embodiment, such a composition is used that the coated optical fiber 3 of the connector plug 6 is butted to the optical element module 102 via the shorter length coated optical fiber 105, alternatively, as shown in FIG. 26, the coated optical fiber 3 may be directly butted to the optical element module 102 without using the shorter length coated optical fiber 105. In this case, when the fiber holding portion 11 and the fiber holding portion 125 are butted, front end of the coated optical fiber 3 is inserted into the fiber hole 131 of the fiber holding portion 125 and comes into contact with the optical element module 102, and then the coated optical fiber 3 will retract and deflect.

Note that the present invention is not limited to aforementioned embodiments. For example, although the composition used in the embodiments 1 to 7 mentioned above is such that front end of the connector plug 6 is inserted into the plug housing receptor portion 34 of the connector socket 8, as for two fiber connecting members holding each of the coated optical fibers 3, 5, the connector plug and the connector socket as described may not be used as long as connection is made by butting the coated optical fibers 3, 5 themselves.

Furthermore, as for a structure for fixing two fiber connecting members themselves such as aforementioned connector plug 6 and the connector socket 8 or the like and a structure for fixing a fiber connecting member and an optical header, for example, screw clamping or the like may be used without being limited particularly to aforementioned latches 12, 42, 57 and windows for locking receiving 37, 45, 53.

Further, as for a structure for fixing fiber cables 2, 4, for example, an adhesive agent or the like may be used without being limited particularly to the aforementioned cable fixing members 7, 9 having a blade (not shown).

Furthermore, with aforementioned embodiments, a plurality of coated optical fibers themselves are connected or a plurality of coated optical fibers and optical elements are connected, it goes without saying that the present invention can be applied to connection of single core coated optical fibers.

In accordance with the present invention, removal of the resin-coating of the coated optical fiber is not required when the coated optical fiber is assembled to the fiber connecting member, and therefore, simplification of assembly step of the optical connector is achievable and optical connectors with improved reliability can be obtained. Further, the number of components constituting the optical connector can be reduced and costs for optical connectors can be reduced.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical connector for butt-connecting a first coated optical fiber in a first fiber cable which is exposed by removing an armor of said first fiber cable to a second coated optical fiber in a second fiber cable which is exposed by removing an armor of said second fiber cable, said optical connector comprising:

a first fiber connecting member holding said first coated optical fiber, said first fiber connecting member including: a first housing which has a first cable fixing portion to which said first fiber cable is fixed; a first fiber holding portion which is jointed to said first housing and includes a first fiber inserting hole having a diameter substantially identical with an outer diameter of said first coated optical fiber; and a first accommodating space, provided in an interior of said first housing while being positioned between said first fiber holding portion and said cable fixing portion, for allowing deflection of said first coated optical fiber when said first coated optical fiber and said second coated optical fiber are butted;

a second fiber connecting member holding said second coated optical fiber, said second fiber connecting member including: a second housing which has a second cable fixing portion to which said second fiber cable is fixed; a second fiber holding portion which is jointed to said second housing, which includes a second fiber inserting hole having a diameter substantially identical with an outer diameter of said second coated optical fiber, and which is butt-connected with respect to said first fiber holding portion; and a second accommodating space, provided in an interior of said second housing while being positioned between said second fiber holding portion and said second cable fixing portion, for allowing deflection of said second coated optical fiber when said first coated optical fiber and said second coated optical fiber are butted; and a fixing structure for detachably fixing said first fiber connecting member and said second fiber connecting member, wherein at least one of an opening edge of said first fiber inserting hole in said first fiber holding portion and an opening edge of said second fiber inserting hole in said second fiber holding portion is chamfered such that a diameter of an opening of the at least one of said first and second fiber inserting holes becomes greater than that of the at least one of said first and second fiber inserting holes other than the opening, wherein said first housing has a first depressed portion, and said first fiber holding portion arranged between said first depressed portion and said first cable fixing portion has a protruded portion for alignment entirely accommodated in said first depressed portion, said protruded portion for alignment being projected from a bottom surface of said first depressed portion and having a through hole constituting a part of said first fiber inserting hole, and wherein said second fiber holding portion has a second depressed portion for alignment to be engaged with said protruded portion for alignment, said second depressed portion for alignment having an opening to receive said protruded portion for alignment, an inner surface of the opening contacting an outer surface of said protruded portion for alignment when the second depressed portion for alignment and said protruded portion for alignment are engaged.

2. An optical connector according to claim 1, wherein said first fiber holding portion is provided in the interior of said first housing, and said second fiber holding portion is provided in the interior of said second housing.

3. An optical connector according to claim 1, wherein a housing receptor portion, to which one said the first housing and said second housing is inserted, is provided to the other of said first housing and said second housing.

4. An optical connector according to claim 1, wherein said fixing structure includes: a locking portion, which is connected to one of said first housing and said second housing, for locking said first housing and said second housing; and a locking receiving portion, which is provided to the other of said first housing and said second housing, for engaging with said locking portion.

5. An optical connector according to claim 1, wherein said first housing and said first fiber connecting member including said first fiber holding portion are molded integrally, and wherein said second housing and said second fiber connecting member including said second fiber holding portion are molded integrally.

6. An optical connector according to claim 5, wherein each of said first fiber connecting member and said second fiber connecting member is comprised of one of polyetherimide, polybutylene terephthalate, polycarbonate, and polyether sulfone.

7. An optical connector according to claim 1: wherein said first fiber cable is fixed to said first cable fixing portion while said first coated optical fiber is inserted into said first fiber inserting hole, wherein said second fiber cable is fixed to said second cable fixing portion while said second coated optical fiber is inserted into said second fiber inserting hole, and wherein at least one of said first coated optical fiber and said second coated optical fiber is projected from a butted surface of at least one of said first fiber holding portion and said second fiber holding portion.

8. An optical connector according to claim 7, wherein said first coated optical fiber is projected from a butted surface of said first fiber holding portion, wherein said second coated optical fiber is projected from a butted surface of said second fiber holding portion, and wherein amount of projection of said first coated optical fiber and said second coated optical fiber is 0.01 to 1.00 mm.

9. An optical connector according to claim 1, further comprising an outer housing for accommodating said first fiber connecting member and said second fiber connecting member mutually fixed by said fixing structure, said outer housing including:

a first taking-out portion, provided at one end of said outer housing, for taking-out said first fiber cable outside said outer housing; and a second taking-out portion, provided at the other end of said outer housing, for taking-out said second fiber cable outside said outer housing.

10. An optical connector according to claim 1, further comprising a seal member in ring-shape which is interposed between said first fiber holding portion and said second fiber holding portion so as to surround one of said first fiber inserting hole and said second fiber inserting hole, in a state where said first fiber connecting member and said second fiber connecting member are fixed.

11. An optical connector for butt-connecting a coated optical fiber in a fiber cable which is exposed by removing an armor of said fiber cable to an optical element, said optical connector comprising:

a fiber connecting member holding said coated optical fiber, said fiber connecting member includes: a housing which has a cable fixing portion to which said fiber cable is fixed; a fiber holding portion which is jointed to said housing and includes a fiber inserting hole with a diameter substantially identical with an outer diameter of said coated optical fiber; and an accommodating space, provided in an interior of said housing while being positioned between said fiber holding portion and said cable fixing portion, for allowing deflection of said coated optical fiber when said coated optical fiber and said optical element are butted;

an optical header including said optical element inside; and a fixing structure for detachably fixing said fiber connecting member and said optical header, wherein an opening edge of said fiber inserting hole in said fiber holding portion is chamfered such that a diameter of an opening of said fiber inserting hole becomes greater than that of said fiber inserting hole other than the opening, and said housing has a depressed portion, and said fiber holding portion arranged between said depressed portion and said cable fixing portion has a protruded portion for alignment entirely accommodated in said depressed portion, said protruded portion for alignment being projected from a bottom surface of said depressed portion and having a through hole constituting a part of said fiber inserting hole.

12. A method of assembling an optical connector, comprising the steps of:

cutting a front edge part of a first coated optical fiber which is exposed by removing an armor at a front edge part of a first fiber cable;

cutting a front edge part of a second coated optical fiber which is exposed by removing an armor at a front edge part of a second fiber cable;

preparing an optical connector according to claim 1;

fixing said first fiber cable to said first cable fixing portion, while inserting said first coated optical fiber into said first fiber inserting hole towards a butted surface side of said first fiber holding portion; and fixing said second fiber cable to said second cable fixing portion, while inserting said second coated optical fiber into said second fiber inserting hole towards a butted surface side of said second fiber holding portion.

13. An optical connector comprising:

a first fiber cable which has a first coated optical fiber and an armor covering said first coated optical fiber, a part of said armor being removed at a front edge part of said first fiber cable such that a part of said first coated optical fiber is exposed; and a first fiber connecting member attached to said first fiber cable while accommodating the exposed part of said first coated optical fiber, said first fiber connecting member including:

a first housing which has a first cable fixing portion to which said first fiber cable is fixed through said armor of said first fiber cable;

a first fiber holding portion which is jointed to said first housing and includes a first fiber inserting hole having an inner surface which confines a movement of said first coated optical fiber on a direction orthogonal to a longitudinal direction of said first coated optical fiber while making said first coated optical fiber become slidable in the longitudinal direction of said first coated optical fiber; and a first accommodating space, provided in an interior of said first housing while being positioned between said first fiber holding portion and said first cable fixing portion, for allowing deflection of said first coated optical fiber when a front edge part of said first coated optical fiber is pushed toward said first cable fixing portion, wherein an opening edge of said first fiber inserting hole in said first fiber holding portion is chamfered such that a diameter of an opening of said first fiber inserting hole becomes greater than that of said first fiber inserting hole other than the opening, and wherein said first housing has a first depressed portion, and said first fiber holding portion arranged between said first depressed portion and said first cable fixing portion has a protruded portion for alignment entirely accommodated in said first depressed portion, said protruded portion for alignment being projected from a bottom surface of said first depressed portion and having a through hole constituting a part of said first fiber inserting hole.

14. An optical connector according to claim 13, further comprising:

a second fiber cable which has a second coated optical fiber to be butt-connected to said first coated optical fiber and an armor covering said second coated optical fiber, a part of said armor being removed at a front edge part of said second fiber cable such that a part of said second coated optical fiber is exposed;

a second fiber connecting member attached to said second fiber cable while accommodating the exposed part of said second coated optical fiber; and a fixing structure for detachably fixing said first fiber connecting member and said second fiber connecting member, wherein said second fiber connecting member including:

a second housing which has a second cable fixing portion to which said second fiber cable is fixed through said armor of said second fiber cable;

a second fiber holding portion which is jointed to said second housing and includes a second fiber inserting hole having an inner surface which confines a movement of said second coated optical fiber on a direction orthogonal to a longitudinal direction of said second coated optical fiber while making said second coated optical fiber become slidable in the longitudinal direction of said second coated optical fiber; and a second accommodating space, provided in an interior of said second housing while being positioned between said second fiber holding portion and said second cable fixing portion, for allowing deflection of said second coated optical fiber when a front edge part of said second coated optical fiber is pushed toward said second cable fixing portion by butt-connecting said first and second coated optical fibers.

15. An optical connector according to claim 14, further comprising an outer housing for accommodating said first fiber connecting member and said second fiber connecting member mutually fixed by said fixing structure, said outer housing including:

a first taking-out portion, provided at one end of said outer housing, for taking-out said first fiber cable outside said outer housing; and a second taking-out portion, provided at the other end of said outer housing, for taking-out said second fiber cable outside said outer housing.

16. An optical connector according to claim 14, further comprising a seal member in ring-shape which is interposed between said first fiber holding portion and said second fiber holding portion so as to surround one of said first fiber inserting hole and said second fiber inserting hole, in a state where said first fiber connecting member and said second fiber connecting member are fixed.

17. An optical connector according to claim 13, further comprising:

an optical element butt-connected to said first coated optical fiber;

an optical header including said optical element inside; and a fixing structure for detachably fixing said first fiber connecting member and said optical header.

18. An optical connector according to claim 14, wherein said second fiber holding portion has a second depressed portion for alignment to be engaged with said protruded portion for alignment, said second depressed portion for alignment having an opening to receive said protruded portion for alignment, an inner surface of the opening contacting an outer surface of said protruded portion for alignment when the second depressed portion for alignment and said protruded portion for alignment are engaged.

* * * * *